US006198242B1

(12) United States Patent
Yokomori et al.

(10) Patent No.: US 6,198,242 B1
(45) Date of Patent: Mar. 6, 2001

(54) POWERED SLIDING DEVICE FOR VEHICLE SLIDE DOOR

(75) Inventors: Kazuhito Yokomori, Yamanashi-ken; Tetsuro Mizuki; Hiroshi Ishigaki, both of Yamanshi-ken, all of (JP)

(73) Assignee: Mitsui Kinzoku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/201,775

(22) Filed: Dec. 1, 1998

(30) Foreign Application Priority Data

| | | |
|---|---|---|
| Dec. 2, 1997 | (JP) | 9-347117 |
| Dec. 5, 1997 | (JP) | 9-352073 |
| Jun. 17, 1998 | (JP) | 10-186883 |
| Jun. 22, 1998 | (JP) | 10-191077 |
| Jul. 21, 1998 | (JP) | 10-221093 |
| Oct. 9, 1998 | (JP) | 10-303404 |
| Oct. 19, 1998 | (JP) | 10-315406 |
| Oct. 27, 1998 | (JP) | 10-321465 |
| Oct. 28, 1998 | (JP) | 10-322876 |

(51) Int. Cl.$^{7}$ ..... G05B 5/00; H02H 7/08; H02P 1/00; H02P 3/00; H02P 7/00

(52) U.S. Cl. ..... 318/445; 318/446; 318/450; 318/489; 318/282; 318/286; 49/360; 49/358; 49/280; 296/155; 192/54.5

(58) Field of Search ..... 49/360, 361, 362, 49/363, 358, 280; 296/155; 192/54.5; 318/445, 446, 450, 468, 489, 282, 286, 12, 17

(56) References Cited

U.S. PATENT DOCUMENTS

| | | | | |
|---|---|---|---|---|
| 5,105,131 | * | 4/1992 | Schap | 318/282 |
| 5,239,779 | | 8/1993 | DeLand et al. . | |
| 5,867,940 | * | 2/1999 | Watanabe et al. | 49/360 |
| 5,979,114 | * | 11/1999 | Clark et al. | 49/360 |
| 6,037,727 | * | 3/2000 | Kawanobe et al. | 318/286 |

FOREIGN PATENT DOCUMENTS

| | | | | |
|---|---|---|---|---|
| 2 311 812 | | 10/1997 | (GB) . | |
| 409273358 | * | 10/1997 | (JP) | E05F/15/14 |
| 409279943 | * | 10/1997 | (JP) | E05F/15/14 |
| 409291754 | * | 11/1997 | (JP) | E05F/15/14 |
| 411166362 | * | 6/1999 | (JP) | E05F/15/14 |
| 411166365 | * | 6/1999 | (JP) | E05F/15/14 |

* cited by examiner

*Primary Examiner*—Robert E. Nappi
*Assistant Examiner*—Edgardo San Martin
(74) *Attorney, Agent, or Firm*—Browdy and Neimark

(57) ABSTRACT

The present powered sliding device comprises a wire drum, a motor for rotating the drum, and a clutch means provided between the drum and the motor. The clutch means has a coupled state for rotating the drum, an uncoupled state, and a brake state. The clutch means is displaced from the coupled state to the brake state when the wire drum is rotated at an over speed. The clutch means in the brake state transmits the over speed rotation of the wire drum to the motor.

21 Claims, 23 Drawing Sheets

FIG.10
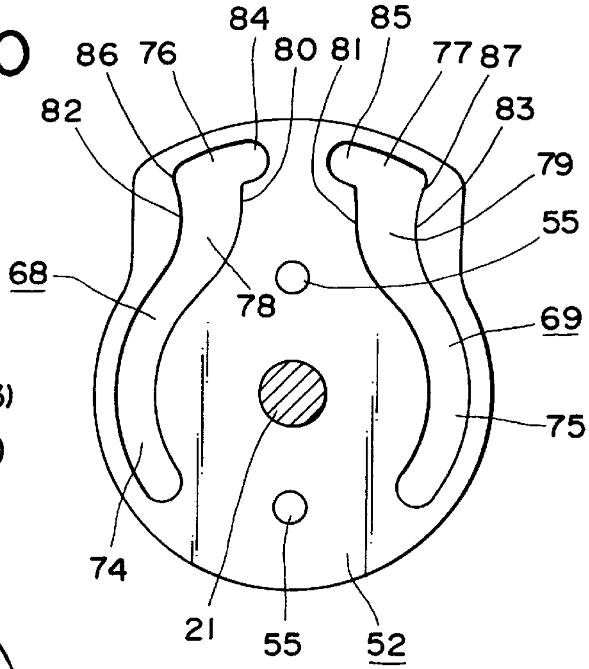
FIG.13
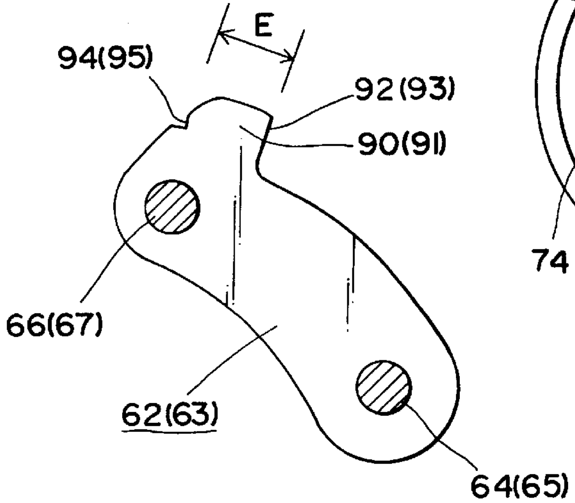
FIG.12
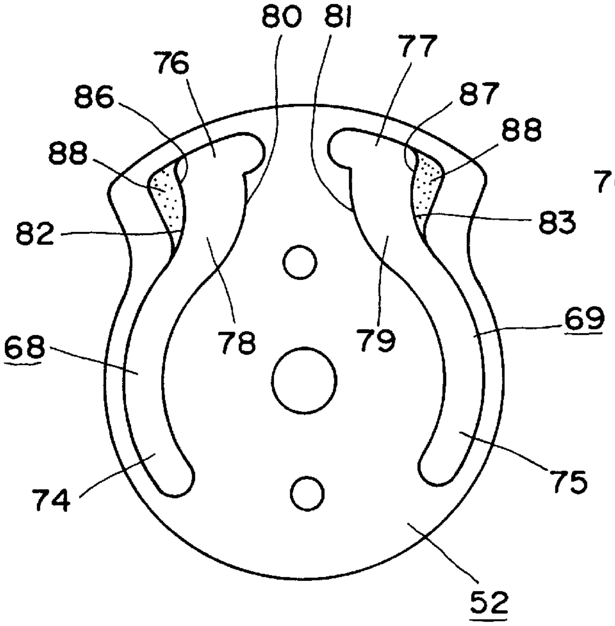
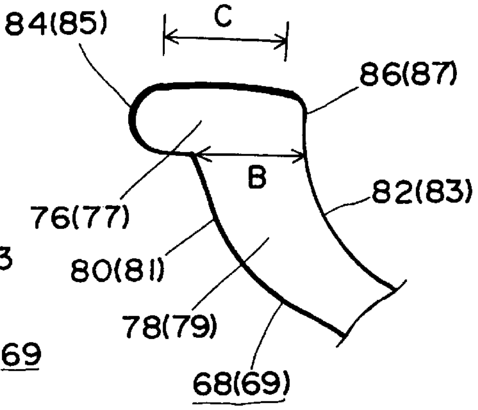
FIG.11

FIG. 20
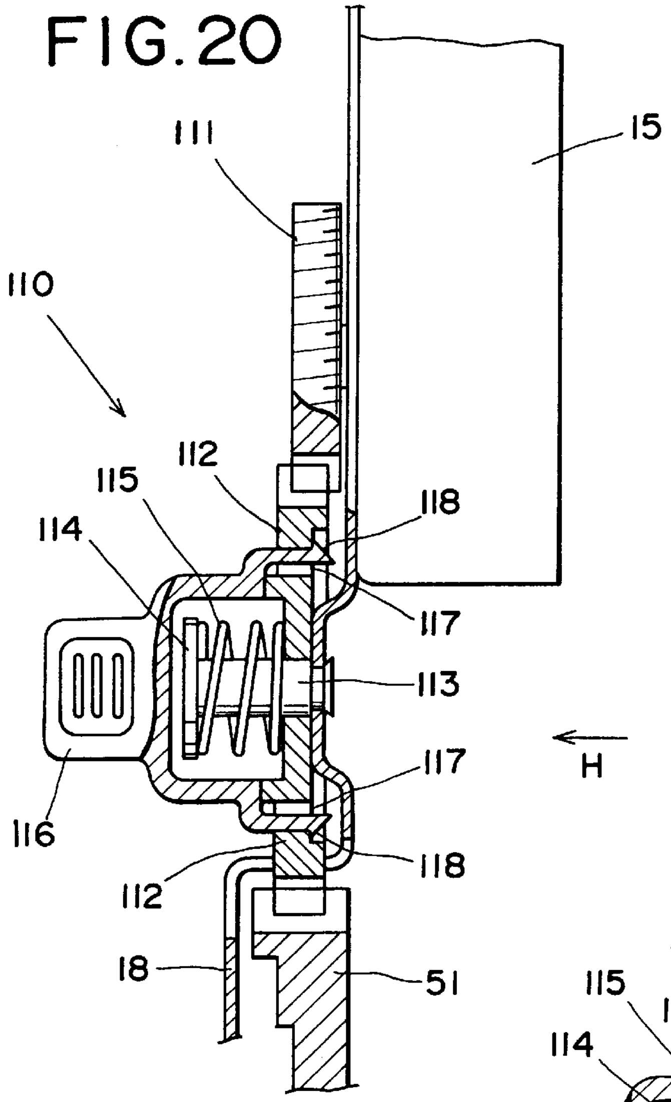
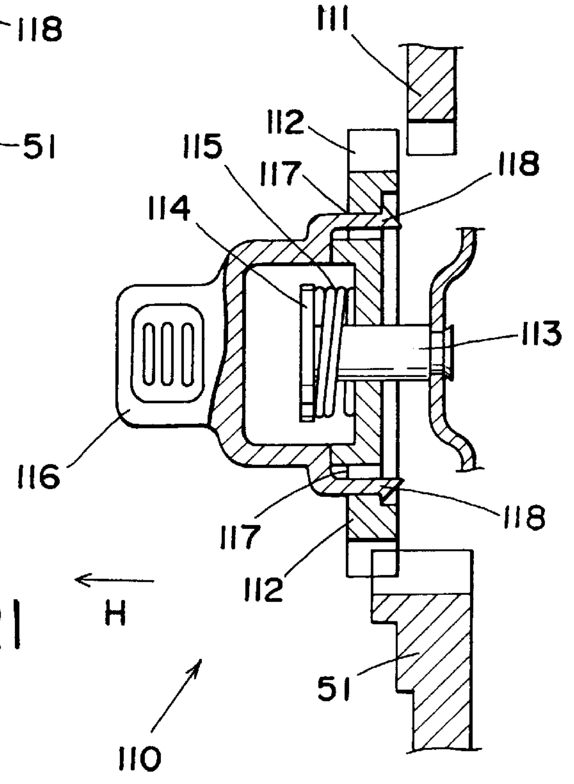
FIG. 21

FIG. 28.
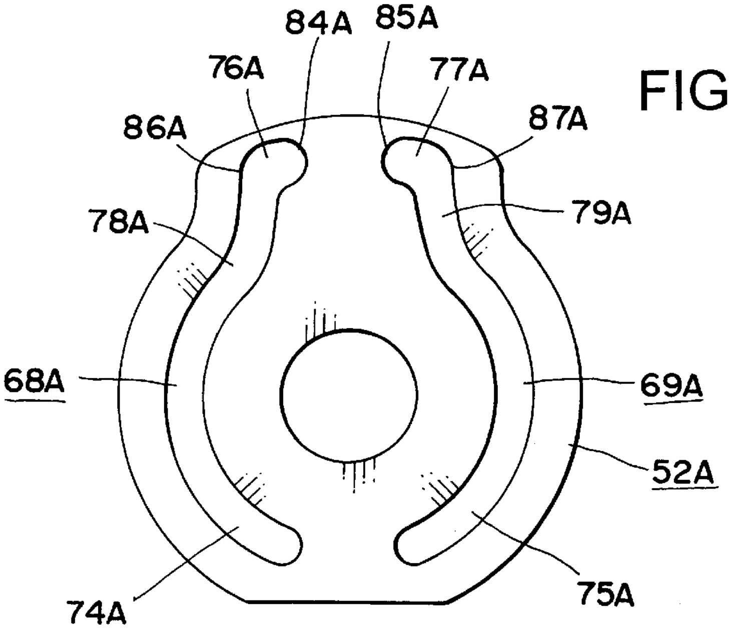
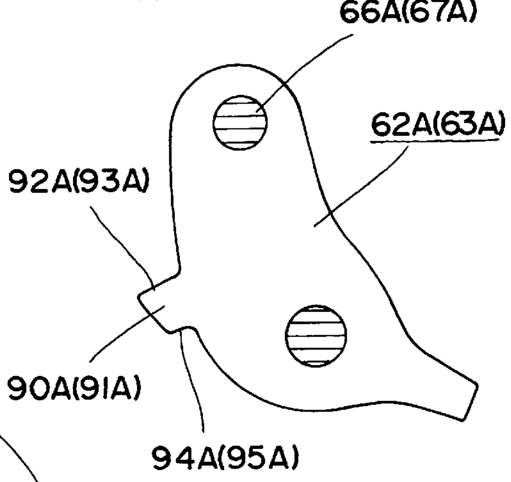
FIG. 29
FIG. 27
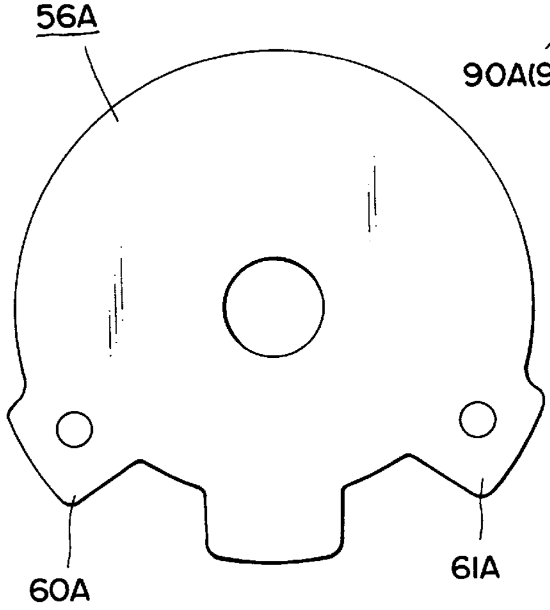

POWERED SLIDING DEVICE FOR VEHICLE SLIDE DOOR

FIELD OF THE INVENTION

The present invention relates to a powered sliding device for a vehicle slide door, and more particularly relates to a clutch mechanism, a tension mechanism, and a door position detecting mechanism in a powered sliding device.

BACKGROUND OF THE INVENTION

GB 2,311,812A published on Oct. 8, 1997 discloses a clutch mechanism designed for a powered sliding device and provided between a wire drum and a motor, which has a first coupled state for transmitting a closing rotation of the motor to the wire drum, a second coupled state for transmitting an opening rotation of the motor to the wire drum, and an uncoupled state of transmitting neither an opening rotation nor a closing rotation of the drum to the motor, and wherein said clutch mechanism is displaceable to the first coupled state by the closing rotation of the motor and is displaceable to the second coupled state by the opening rotation of the motor, and wherein said clutch mechanism is held in the first coupled state or in the second coupled state when the rotation of the motor is stopped by deenergizing the motor when the clutch mechanism is in the first coupled state or in the second coupled state, and wherein said clutch mechanism is returned to the uncoupled state by the opening rotation of the motor by a predetermined amount when the clutch mechanism is in the first coupled state, and said clutch mechanism is returned to the uncoupled state by the closing rotation of the motor by the predetermined amount when the clutch mechanism is in the second coupled state.

A problem to be solved of the above prior art clutch mechanism is that it has no brake mechanism or no brake state for preventing the wire drum from being rotated at an over speed. Therefore, when a powerful external force in a direction of accelerating the door is applied to the door by an intensive inclination of the vehicle body, it is impossible to prevent the door from moving at the over speed.

Furthermore, another problem to be solved of the above prior art clutch mechanism is that an emergency release mechanism of the clutch mechanism is not practical. In the clutch mechanism which is caused to be returned to the uncoupled state from the coupled state by the power of the motor, the emergency release mechanism for returning the clutch mechanism to the uncoupled state from the coupled state by the manual operation, is required when the motor is out of order. However, the emergency release mechanism of the prior art clutch mechanism requires a very complex and troublesome operation when the slide door is fully closed or the slide door is fully opened.

Furthermore, GB 2,311,812A also discloses a tension mechanism for a powered sliding device, which comprises a housing, a wire drum rotatably attached to the housing with a drum shaft, a wire cable for coupling the wire drum with the slide door, and a pair of tension rollers brought into contact with the wire cable. The wire cable has a first cable portion for pulling the door rearward or in the opening direction and a second cable portion for pulling the door forward or in the closing direction, and the tension rollers respectively come into contact with the first cable portion and the second cable portion.

The problem to be solved of the prior art tension mechanism is that there are two pieces of tension rollers which are respectively directly attached to the housing. Therefore, the tension rollers can absorb the slack of the wire cable in use, but cannot apply an initial tension to the wire cable.

Furthermore, U.S. Pat. No. 5,239,779 discloses a powered sliding device which comprises a sensor or a switch for detecting an open state of the slide door (refer to column 14, lines 14 and 15).

As the prior art switch is designed to detect the position of the door by the contact with the door, it is attached at a place completely away from the housing to which the wire drum of the powered sliding device is attached. This requires a new independent installation work of the signal cable which connects the controller of the sliding device and the switch.

OBJECTS OF THE INVENTION

Accordingly, an object of the present invention is to provide a clutch mechanism for a powered sliding device, which comprises a brake mechanism or a brake state capable of preventing a wire drum from rotating at an over speed.

Furthermore, another object of the present invention is to provide an emergency release mechanism for a powered sliding device, which can surely return a clutch mechanism to an uncoupled state by an easy manual operation, even if the slide door is fully closed or fully opened.

Furthermore, another object of the present invention is to provide an improved tension mechanism in a powered sliding device.

Furthermore, another object of the present invention is to provide a door position detecting mechanism in a powered sliding device, which does not require a new independent installation work of a signal cable for connecting the controller of the sliding device and the switch.

Still other objects, features, and advantages of the present invention will become apparent from by understanding the following detailed description with reference to the accompanying drawings.

BRIEF DESCRIPTION OF THE DRAWINGS

FIG. 10 a front view of a guide plate of the clutch mechanism;

FIG. 11 is a partially enlarged view of a guide slot in the guide plate;

FIG. 12 is a front view of another embodiment of the guide plate;

FIG. 13 is an enlarged view of a clutch arm of the clutch mechanism;

FIG. 20 is a cross sectional view showing an emergency release mechanism of the clutch mechanism;

FIG. 21 is a view showing an operational state of the emergency release mechanism;

FIG. 27 is a front view of a clutch plate of the clutch mechanism;

FIG. 28 is a front view of a guide plate of the clutch mechanism;

FIG. 29 is an enlarged view of a clutch arm of the clutch mechanism;

DESCRIPTION OF THE PREFERRED EMBODIMENTS

Figure 1:
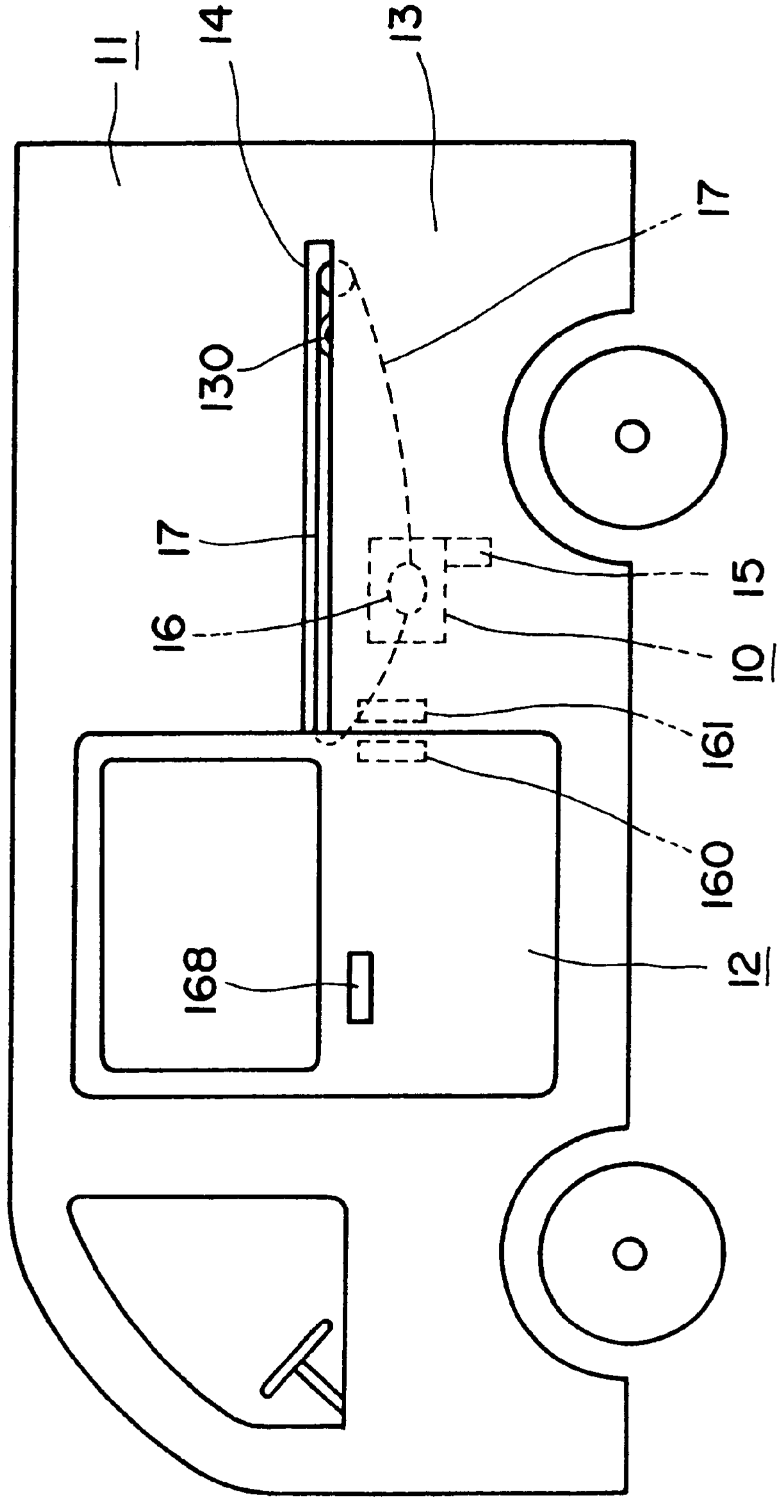
FIG. 1 is a side view of a vehicle having a powered sliding device according to the present invention.

One embodiment of the present invention will now be described with reference to the accompanying drawings. FIG. 1 shows a side view of a vehicle provided with a powered sliding device 10 according to the present invention. The vehicle comprises a vehicle body 11 and a slide door 12 slidably attached to the vehicle body 11. The door 12 is slidable along a guide rail 14 attached to a quarter panel 13 of the vehicle body 11.

Figure 24:
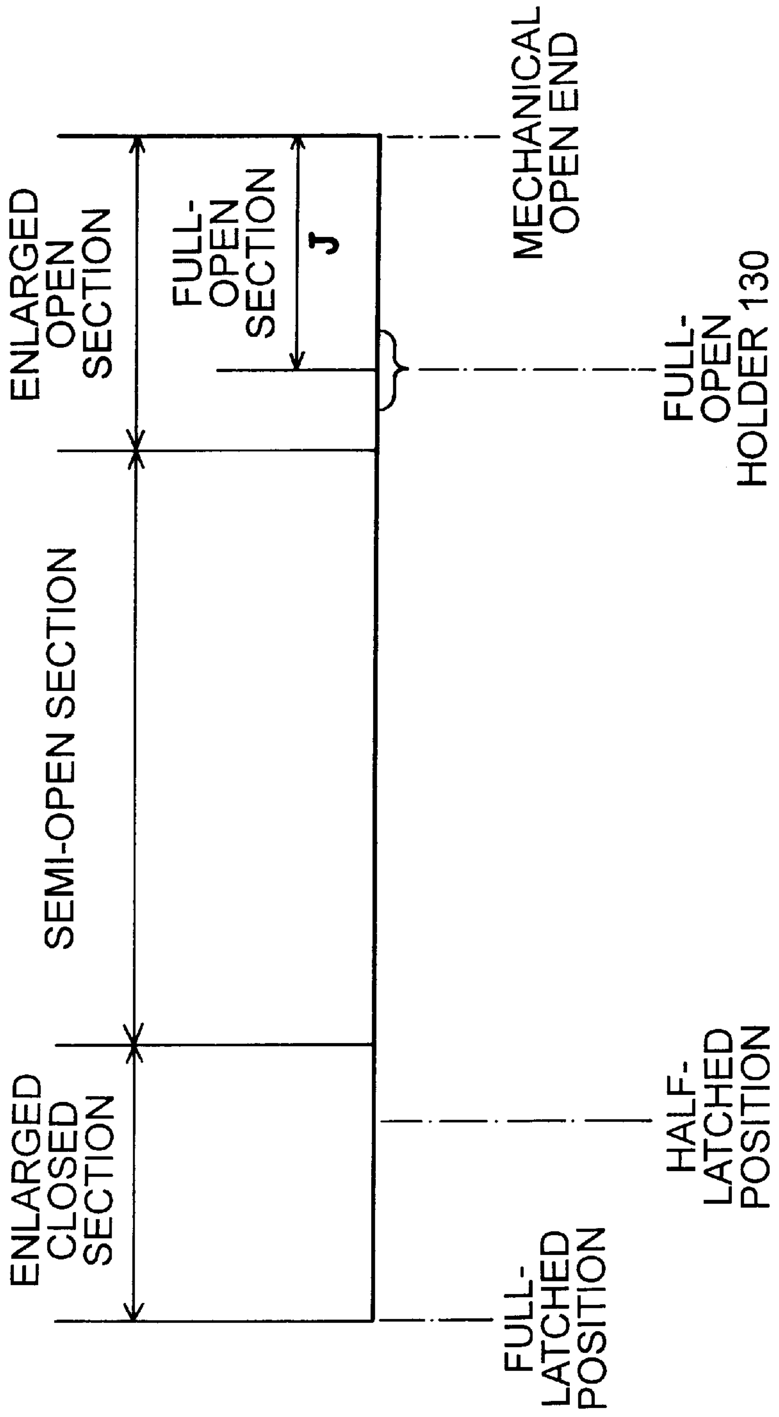
FIG. 24 is an explanation illustration showing sliding sections of the slide door.

The sliding device 10 is arranged in an inside space of the quarter panel 13, and comprises a reversible motor 15 and a wire drum 16 rotated by power of the motor 15. The drum 16 is coupled with the door 12 by a wire cable 17, and the door 12 is slid in an opening direction or in a closing direction when the cable 17 is pulled in the opening direction or in the closing direction by the rotation of the drum 16. As shown in FIG. 24, the door 12 is slidable between a full-latched position and a mechanical open end. The total sliding section of the door 12 is divided as shown in FIG. 24 for convenience.

TENSION MECHANISM OF WIRE CABLE

Figure 2:
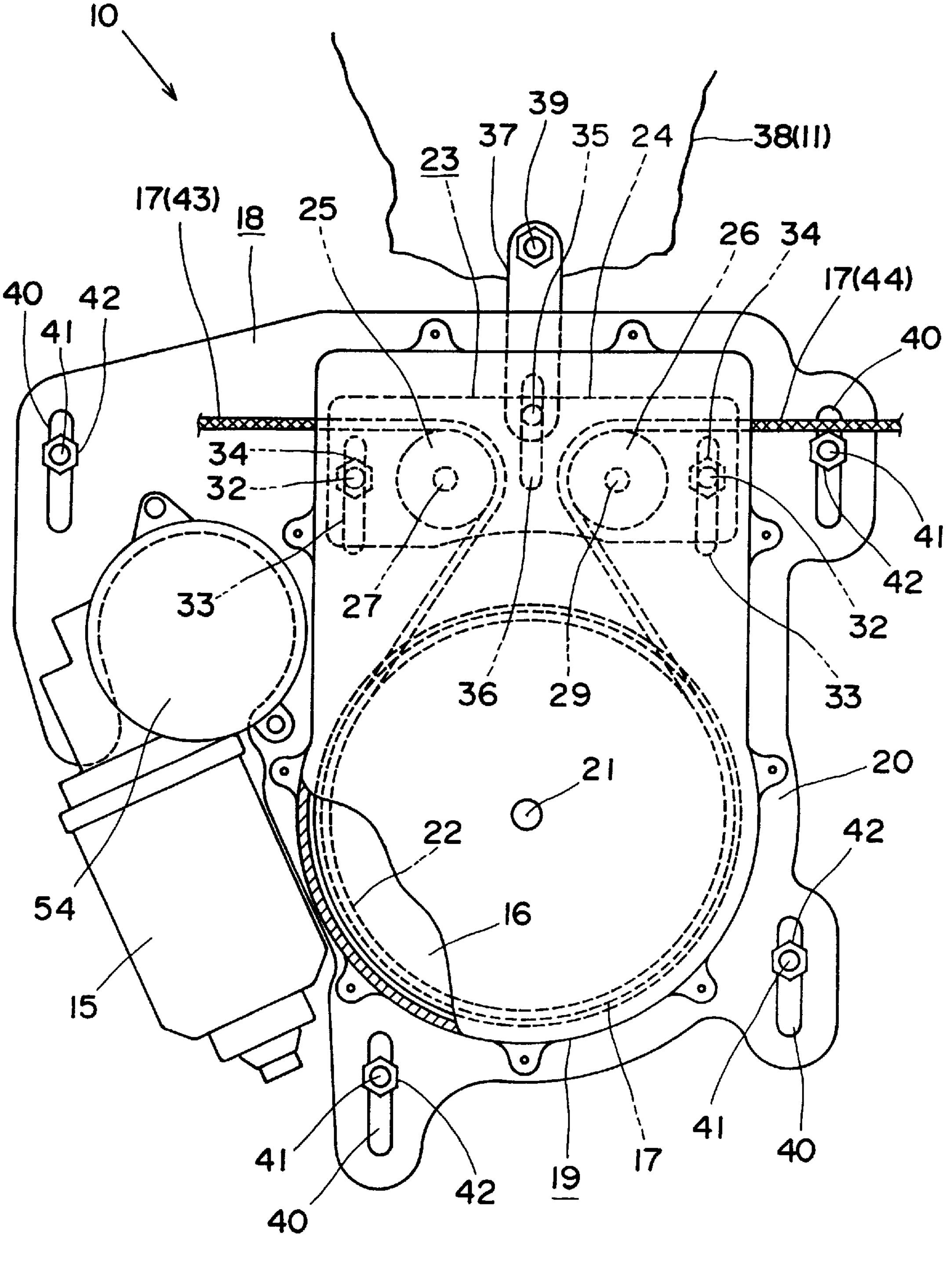
FIG. 2 is a front view of the sliding device.
Figure 8:
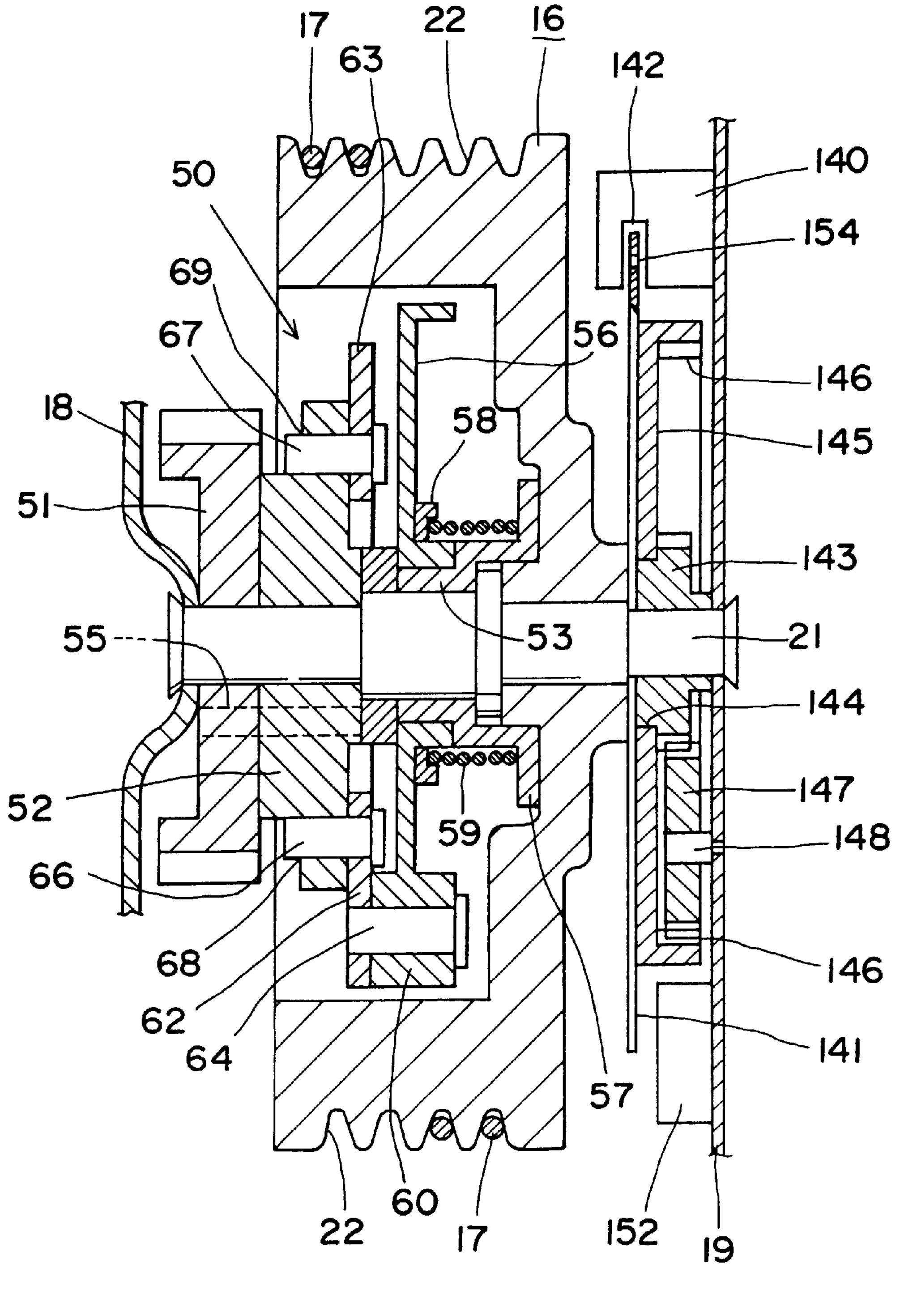
FIG. 8 is a vertical cross sectional side view of the sliding device having a clutch mechanism of a first embodiment according to the present invention.
Figure 9:
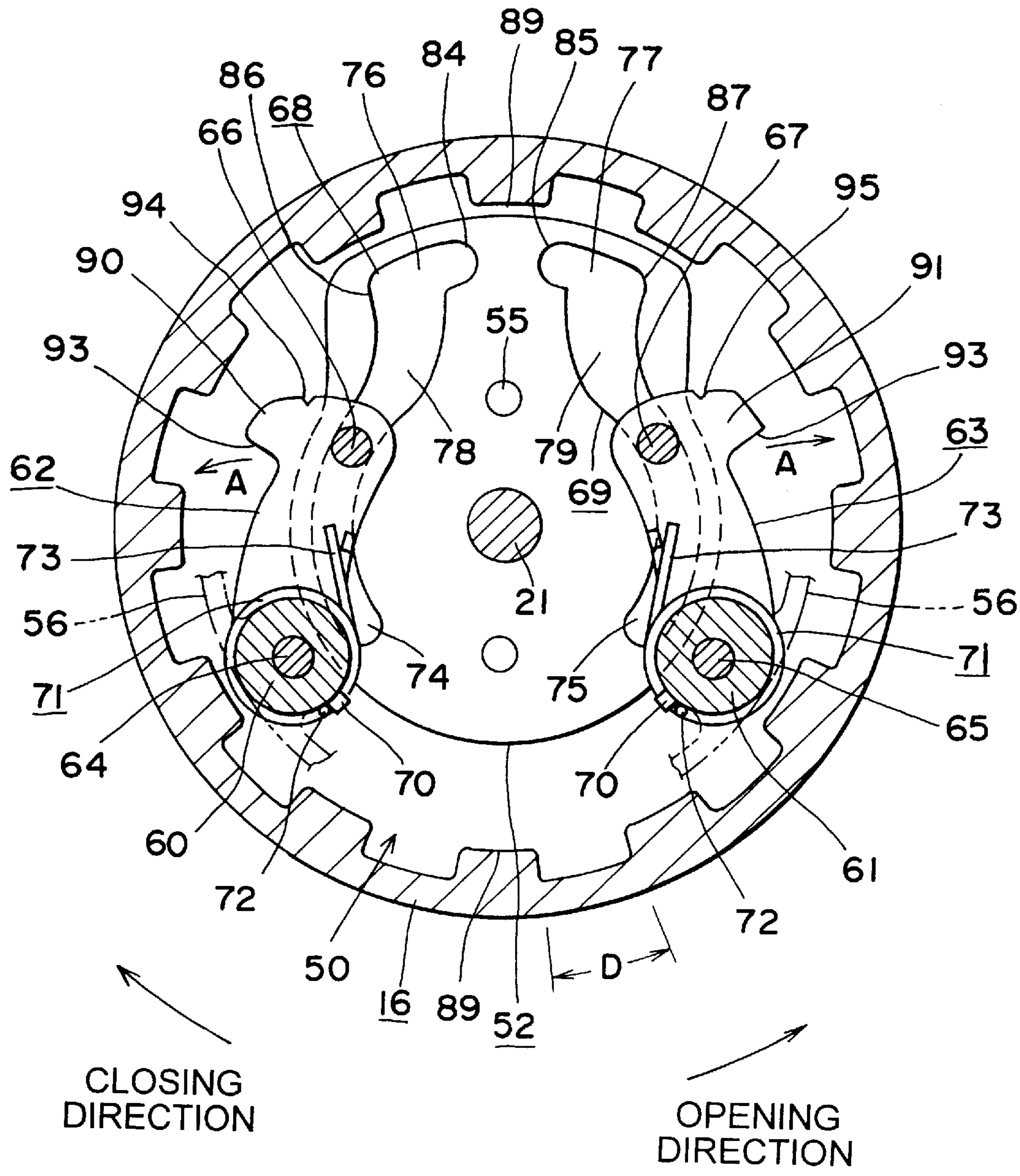
FIG. 9 is a vertical cross sectional view showing an uncoupled state of the clutch mechanism.

FIG. 2 shows a front of the powered sliding device 10. The sliding device 10 has a housing 20 which comprises a vertical base plate 18 attached to the vehicle body 11 and a cover plate 19 attached to the base plate 18. The wire drum 16 is supported between the plate 18 and the plate 19 with a horizontal drum shaft 21. The drum 16 is formed into a cylindrical shape, as shown in FIGS. 8 and 9, having a substantially closed end and an opposite open end. The wire cable 17 is wound around a peripheral surface of the drum 16 along a wire groove 22 formed in the peripheral surface of the drum 16. The wire cable 17 comprises a first cable portion 43 for pulling the door 12 rearward or in the opening direction and a second cable portion 44 for pulling the door forward or in the closing direction.

Figure 3:
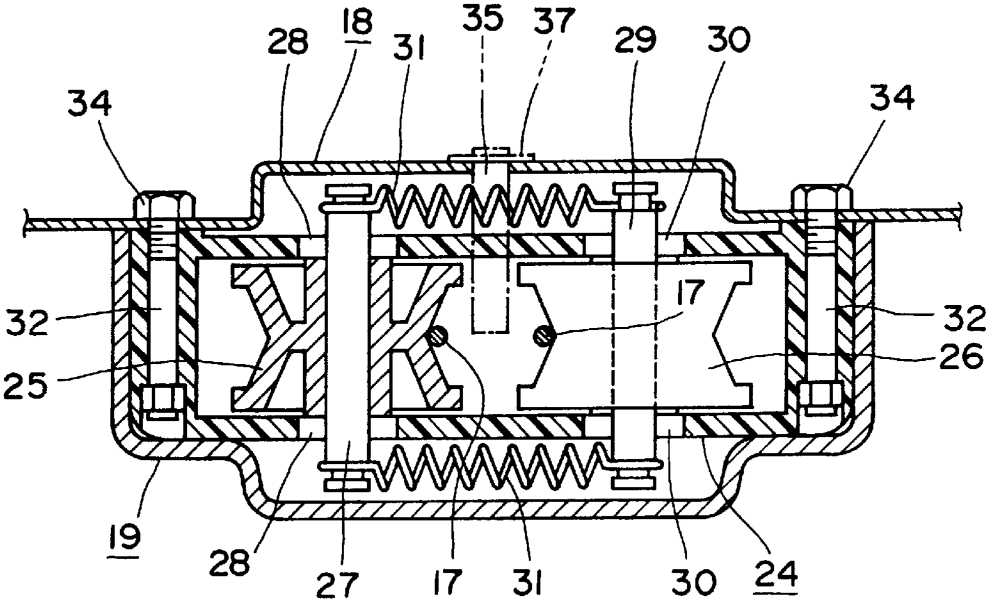
FIG. 3 is a horizontal cross sectional view of a tension unit of the sliding device.
Figure 4:
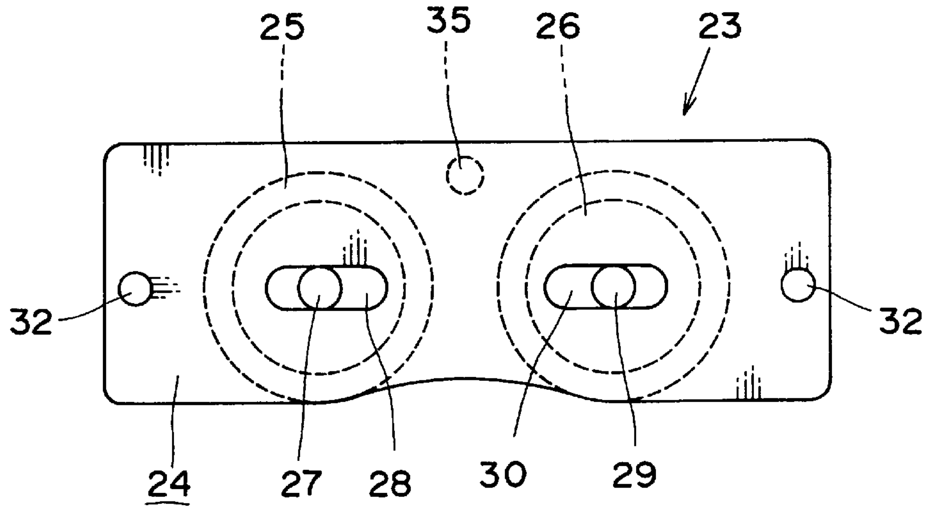
FIG. 4 is a front view of the tension unit.
Figure 6:
FIG. 6 is a front view of a vertical link of the sliding device.

At a position above the wire drum 16 and between the base plate 18 and the cover plate 19, a tension unit 23 for the wire cable 17 is provided. As shown in FIGS. 3 and 4, a tension case 24 of the unit 23 is shaped like a hollow rectangular parallelepiped, and has tension rollers 25, 26 in an inside space thereof which come into contact with the first cable portion 43 and the second cable portion 44, respectively. Each end of a tension shaft 27 of the roller 25 is slidably engaged with a horizontal slot 28 formed in the case 24, and each end of a tension shaft 29 of the roller 26 is slidably engaged with a horizontal slot 30 of the case 24. At least one tension spring 31 is provided between the shaft 27 and the shaft 29 so that the shaft 27 and the shaft 29 are urged in a direction of approaching each other by the elasticity of the spring 31.

Bolts 32 and 32 are fixed on left and right sides of the tension case 24, respectively. Tip ends of the bolts 32, 32 are projected rearward from the base plate 18 through vertical supporting slots 33, 33 formed in the base plate 18, and nuts 34, 34 are screwed thereon. The tension case 24 becomes slidable in an up-and-down direction (in a vertical direction) relative to the base plate 18 (housing 20), by loosening the nuts 34, 34.

In a horizontally mid position of the tension case 24, one end of a pin 35 is embedded, and the other end of the pin 35 is projected rearward from the base plate 18 through a vertical elongated opening 36 formed in the base plate 18 to be coupled with a lower portion of a vertical link 37. An upper portion of the link 37 is fixed to a panel 38 of the vehicle body 11 with a bolt 39. A plurality of screw shafts 41 are fixed to the panel 38. The base plate 18 is fixed to the panel 38 by screwing nuts 42 onto the screw shafts 41 which are inserted into vertical mounting slots 40 of the base plate 18.

Figure 5:
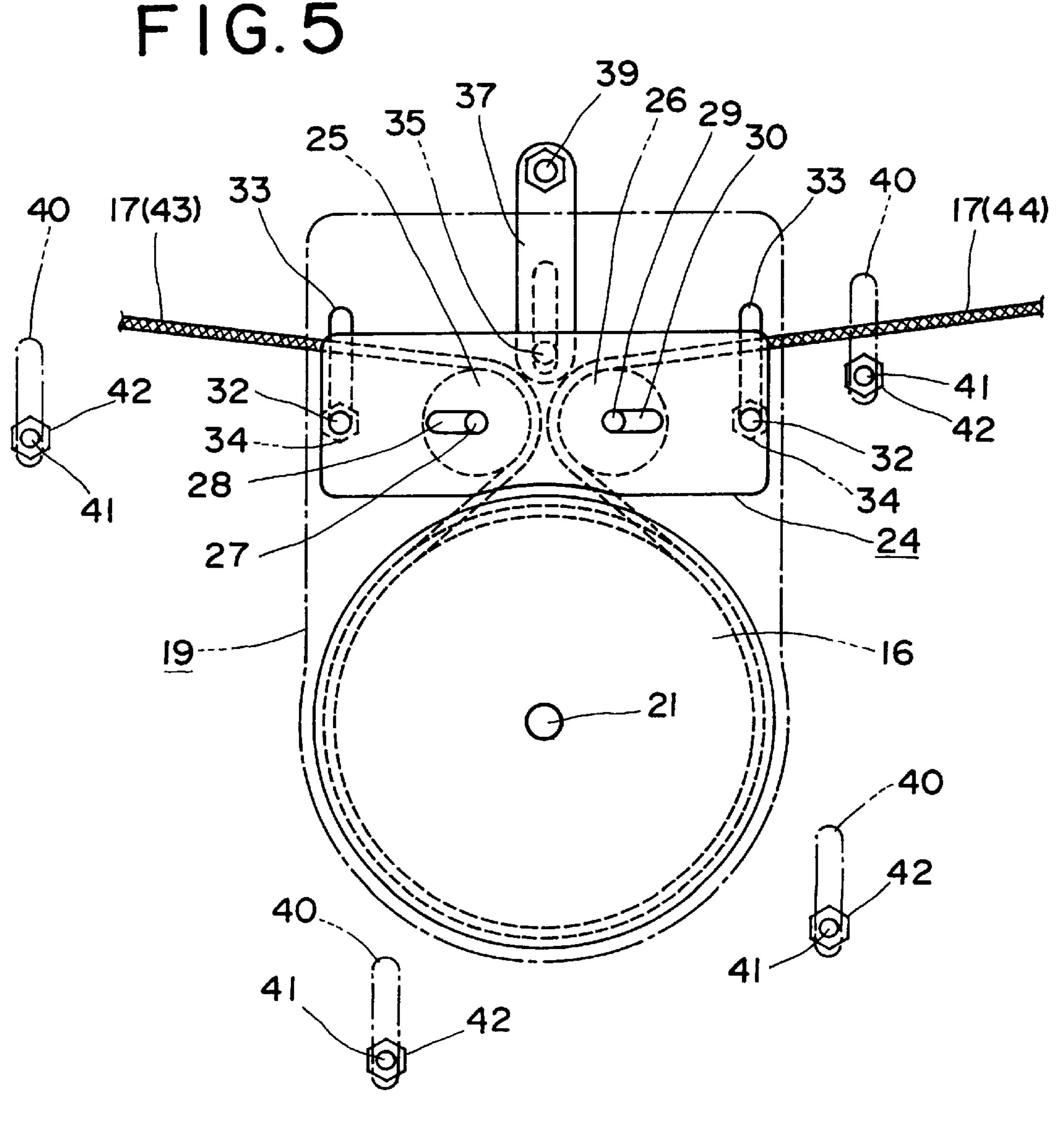
FIG. 5 is a schematic illustration showing the state where the tension unit is brought near a wire drum of the sliding device.
Figure 7:
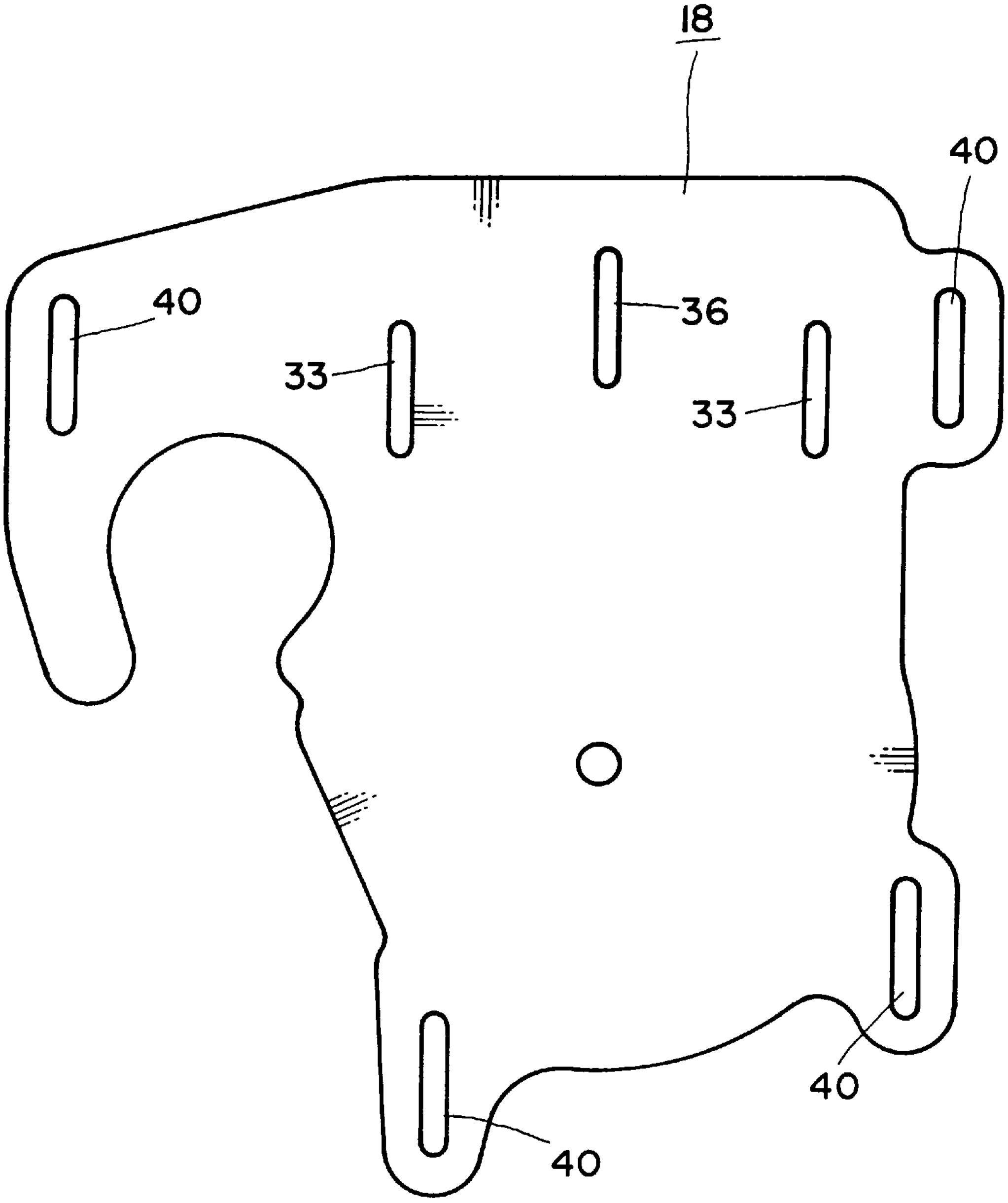
FIG. 7 is a front view of a base plate of the sliding device.

Next, the operation of the tension mechanism will be described. Before assembling the powered sliding device 10 to the vehicle body 11, the tension case 24 is previously fixed to the base plate 18 as shown in FIG. 5 by screwing the nuts 34, 34 onto the bolts 32, 32 of the case 24 in the state where the tension case 24 is caused to come nearest to the wire drum 16. In this state, the bolts 32, 32 of the case 24 are positioned at the lower end portions of the vertical supporting slots 33, 33 of the plate 18.

Next, the base plate 18 of the powered sliding device 10 is caused to be brought near to the panel 38 of the vehicle body 11, and the screw shafts 41 fixed to the panel 38 are inserted into the mounting slots 40 of the plate 18, and the upper portion of the vertical link 37 is then fixed to the panel 38 with the bolt 39. At this time, the nuts 42 may be screwed onto the screw shafts 41, but the nuts 42 should not be tightened. In this state, the link 37 is being fastened to the vehicle body 11 with the bolt 39, and the tension case 24 is being coupled with the link 37 with the pin 35, and further, the base plate 18 (housing 20) is being fastened to the case 24 with the bolts 32 and the nuts 34. Accordingly, the housing 20 and the tension case 24 are not displaceable vertically relative to the vehicle body 11.

After the vertical link 37 has been fastened to the vehicle body 11, the tip of the first cable portion 43 and the tip of the second cable portion 44 are coupled with the slide door 12. At this time, since the tension case 24 is brought near to the wire drum 16 as shown in FIG. 5, the arrangement length of the wire cable 17 is reduced, so that the cable 17 may easily be coupled with the slide door 12.

After the wire cable 17 has been coupled with the door 12, the nuts 34, 34 are loosened to make the tension case 24 become slidable in the up-and-down direction relative to the base plate 18. Consequently, the base plate 18 (housing 20) is slid downward relative to the case 24 (vehicle body 11), as shown in FIG. 2, due to the comparatively heavy weight of the powered sliding device 10, and the bolts 32, 32 of the case 24 relatively move to the upper side of the slots 33, 33 of the plate 18, and the wire drum 16 is separated from the tension case 24. Consequently, the arrangement length of the wire cable 17 is increased, and thereby the initial tension is applied to the wire cable 17. The magnitude of the initial tension is substantially determined by the weight of the powered sliding device 10. When a fine adjustment of the pressure of the initial tension is desired, the housing 20 should be moved a little upward or downward. This is an extremely easy work.

After the initial tension has been applied to the wire cable 17, the plurality of nuts 42 are tightened so as to fix the housing 20 to the vehicle body 11 rigidly. Consequently, the assembling of the sliding device 10 to the vehicle body 11 is finished. It is noted that, after the housing 20 has been fastened to the vehicle body 11, the nuts 34 for fastening the tension case 24 to the base plate 18 become unnecessary. The slack in use of the wire cable 17 to which the initial tension is applied, is absorbed by the elasticity of the tension spring 31 provided between the tension rollers 25, 26.

As mentioned above, since the tension unit 23 comprises one piece of tension case 24, two pieces of tension rollers 25, 26, and at least one piece of tension spring 31, the tension unit 23 is small sized and inexpensive. Further, since the tension unit 23 can be arranged so as not to overlap with the wire drum 16 in the axial direction of the drum shaft 21, the thickness of the powered sliding device 10 can be reduced. Furthermore, since the tension unit 23 can be slid in a radial direction of the drum shaft 21, the initial tension can be applied to the wire cable 17 by moving the housing 20 provided with the wire drum 16 relative to the tension unit 23. Furthermore, since the work for applying the initial tension to the wire cable 17 can be a part of the work for mounting the powered sliding device 10 to the vehicle body 11, the total working efficiency is improved. Furthermore, since the initial tension is applied to the wire cable by utilizing the weight of the housing 20, heavy works are hardly required.

CLUTCH MECHANISM OF FIRST EMBODIMENT

As shown in FIGS. 8 and 9, a clutch mechanism 50 according to the first embodiment of the present invention is substantially accommodated in a comparatively large inside space of the wire drum 16. The clutch mechanism 50 has a first coupled state for transmitting a closing rotation of the motor 15 to the drum 16, a second coupled state for transmitting an opening rotation of the motor 15 to the drum 16, a first brake state for transmitting the closing rotation of the drum 16 to the motor 15, a second brake state for transmitting the opening rotation of the drum 16 to the motor 15, and an uncoupled state for transmitting neither an opening rotation nor a closing rotation of the drum 16 to the motor 15.

To the shaft 21 of the drum 16, an output gear or a clutch gear 51, a guide plate 52, and a sleeve 53 are respectively rotatably attached. The output gear 51 is connected with the motor 15 through a reduction mechanism 54 (FIG. 2). The output gear 51 and the guide plate 52 are fixed with each other by a connect pin 55 so as to rotate as one piece. Therefore, in FIG. 9 and in the figures similar to FIG. 9, the output gear 51 is omitted. A disk-shaped clutch plate 56 is rotatably attached on the periphery of the sleeve 53. A spring 59 is provided between the clutch plate 56 and a flange 57 of the sleeve 53 through a member 58. The spring 59 applies a little rotational resistance to the clutch plate 56.

The clutch plate 56 has, on outer edge portions thereof, boss portions 60, 61 shown by the cross section in FIG. 9 to which clutch arms 62, 63 are rotatably attached with shafts 64, 65, respectively. The clutch arms 62, 63 respectively have at the tips thereof slide pins 66, 67 which are slidably engaged with guide slots 68, 69 formed in the guide plate 52, respectively. Each of the boss portions 60, 61 has a stud 70 projecting in a radial direction of the boss portion. Each of the boss portions 60, 61 is provided with a spring 71 which has one end 72 brought into contact with the corresponding one of the studs 70. The other ends 73, 73 of the springs 71, 71 are respectively engaged with the clutch arms 62, 63 so that the clutch arms 62, 63 are urged in a direction opposite to an arrow A. The springs 71, 71 are designed to prevent the clutch arms 62, 63 from being unintentionally moved by the vibration of the vehicle body or the own weight of the clutch arm, and therefore the required resilient force thereof may become very weak.

The guide slots 68, 69 are horizontally symmetrical as shown in FIG. 10. The guide slots 68, 69 respectively comprise circular arc-shaped inner slots 74, 75 about the drum shaft 21 as a center, circular arc-shaped outer slots 76, 77 about the shaft 21 as a center, and communication slots 78, 79 for connecting the inner slots 74, 75 and the outer slots 76, 77. Each of the clearances between inside walls 80, 81 and outside walls 82, 83 of the communication slots 78, 79 is wider as being away from the drum shaft 21. As shown in FIG. 11, the clearance at the tip of each of the communication slots 78, 79 is indicated by "B". The clearance B permits the clutch mechanism 50 to return to the uncoupled state from the coupled state and the brake state by a manual operation, to be described later. Semicircular engaging portions 84, 85 are formed at one sides of the outer slots 76, 77. The other sides of the outer slots are formed into contact faces 86, 87 which are connected to the outside walls 82, 83 with no difference in level. Incidentally, the distance that the slide pins 66, 67 can move within the outer slots 76, 77 is expressed by "C".

As shown in FIG. 12, cushions 88 are preferably attached to the contact faces 86, 87 of the guide slots 68, 69, respectively, so as to absorb the shock which is generated by the collision of the slide pins 66, 67 with the contact faces 86, 87.

To be described later in detail, when rotating the guide plate 52 by the power of the motor 15, one of the slide pins 66, 67 is relatively moved toward the corresponding outer slot in the guide slot to rotate the corresponding one of the clutch arms 62, 63 in the direction of the arrow A, and the corresponding clutch arm is then engaged with the wire drum 16. At this time, the other of the slide pins 66, 67 is merely moved in the inner slot, and accordingly, the other of the clutch arms 62, 63 is not engaged with the wire drum 16.

On an inner surface of the wire drum 16, a plurality of projections 89 projecting toward the drum shaft 21 are formed at constant intervals D. At the tips of the clutch arms 62, 63, clutch pawls 90, 91 projecting in a direction away from the drum shaft 21 are formed. One sides of the clutch pawls 90, 91 are respectively formed to be coupling faces 92, 93 substantially in parallel with the radial direction of the drum shaft 21. Brake dents 94, 95 are formed in the other sides of the clutch pawls 90, 91. Each width E between the coupling faces 92, 93 and the brake dents 94, 95 is narrower than the gap D of the projections 89, and the clutch pawls 90 or 91 comes into the gap D to be engaged with the projections 89 when the clutch arms 62 or 63 rotates in the direction of the arrow A.

Figure 14:
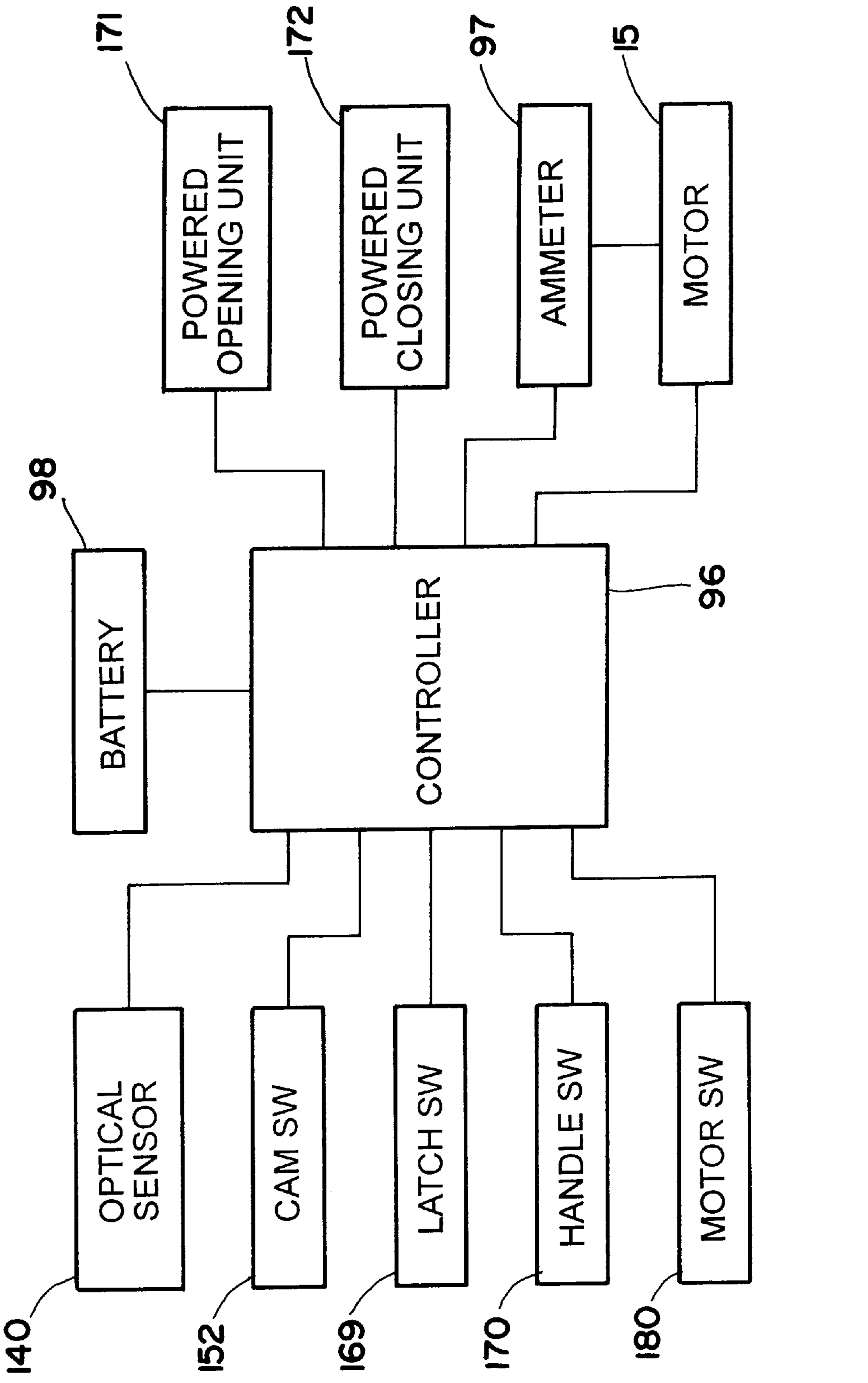
FIG. 14 is a diagram of a block circuit for performing an operation according to the present invention.

FIG. 14 is a diagram of a block circuit for performing control operations according to the present invention. The block circuit comprises a controller 96, an ampere meter 97 for measuring the current flowing in the motor 15, and a battery 98 mounted on the vehicle body 11. The rest circuit of the block circuit will be described later.

Next, the operation of the clutch mechanism 50 will be described.

(Uncoupled State of Clutch Mechanism 50)

As shown in FIG. 9, when the slide pins 66, 67 of the clutch arms 62, 63 pivotally mounted to the boss portions 60, 61 of the clutch plate 56 with the shafts 64, 65, are both located in the inner slots 74, 75 formed at positions apart from the drum shaft 21 by a predetermined constant distance, the clutch pawls 90, 91 of the clutch arms 62, 63 are both separated from the projections 89 of the wire drum 16 so as to be disengaged therewith. This state where both clutch pawls 90, 91 are disengaged with the projections 89, is the uncoupled state of the clutch mechanism 50, and in this state, the slide door 12 can be moved by manual power in the opening direction or in the closing direction, because the rotation of the wire drum 16 in any direction is not transmitted to the clutch pawls 90, 91 (motor 15).

(Coupled State of Clutch Mechanism 50)

When rotating the motor 15 in the closing direction, the guide plate 52 is also rotated in the closing direction in FIG. 9. At this time, since a rotational resistance is applied to the clutch plate 56 by the elasticity of the spring 59, the clutch plate 56 and the clutch arms 62, 63 attached to the plate 56 are not rotated around the drum shaft 21 for a while. Then, the slide pins 66, 67 of the clutch arms 62, 63 are relatively moved in the guide slots 68, 69 of the guide plate 52, respectively, and the slide pin 67 comes into the communication slot 79 of the guide slot 69 from the inner slot 75, and is then guided by the inside wall 81 of the communication slot 79 to be gradually separated from the drum shaft 21, thereby the clutch arm 63 is swung in the direction of the arrow A about the shaft 65. When the slide pin 67 has reached the outer slot 77 from the communication slot 79, the clutch pawl 91 of the clutch arm 63 projects outermost and comes into the gap D between projections 89, 89 to engage with the engaging portion 85 of the outer slot 77. During this moment, the other slide pin 66 is moved only in the circular arc-like inner slot 74 about the drum shaft 21 as a center, and therefore, the other clutch arm 62 does not move in the direction of the arrow A.

Figure 15:
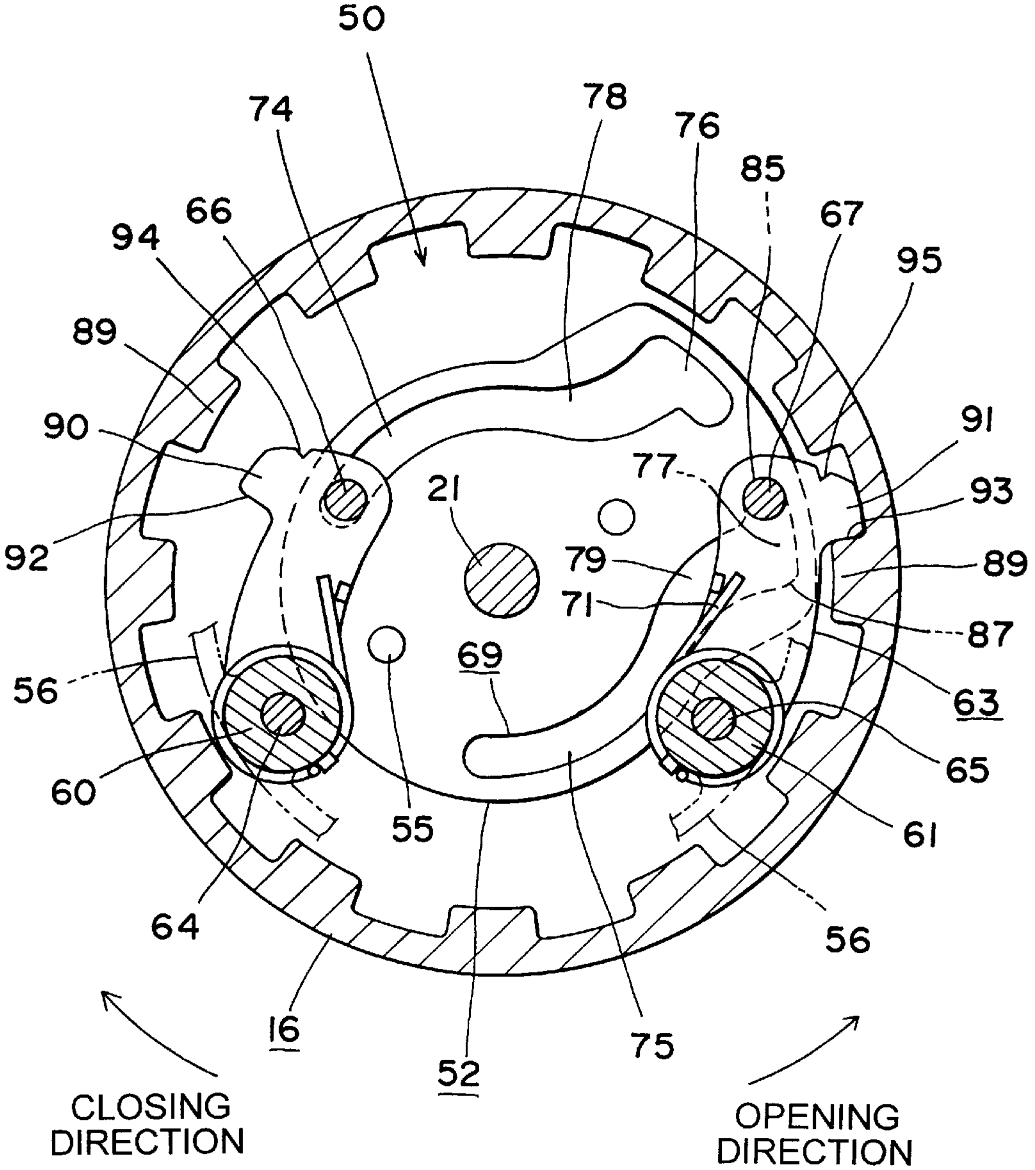
FIG. 15 is an explanation illustration showing a first coupled state of the clutch mechanism.

When the slide pin 67 has been engaged with the engaging portion 85 of the outer slot 77, the closing rotation of the guide plate 52 is transmitted to the clutch arm 63 through the slide pin 67, and the clutch arm 63 is then rotated in the closing direction around the drum shaft 21 together with the clutch plate 56, thereby, as shown in FIG. 15, the coupling face 93 of the clutch pawl 91 is engaged with the projection 89 of the wire drum 16 so as to rotate the wire drum 16 in the closing direction. Consequently, the wire drum 16 causes the door 12 to slide in the closing direction through the wire cable 17. This state where the coupling face 93 of the clutch pawl 91 is engaged with the projection 89, is the first coupled state of the clutch mechanism 50.

Figure 19:
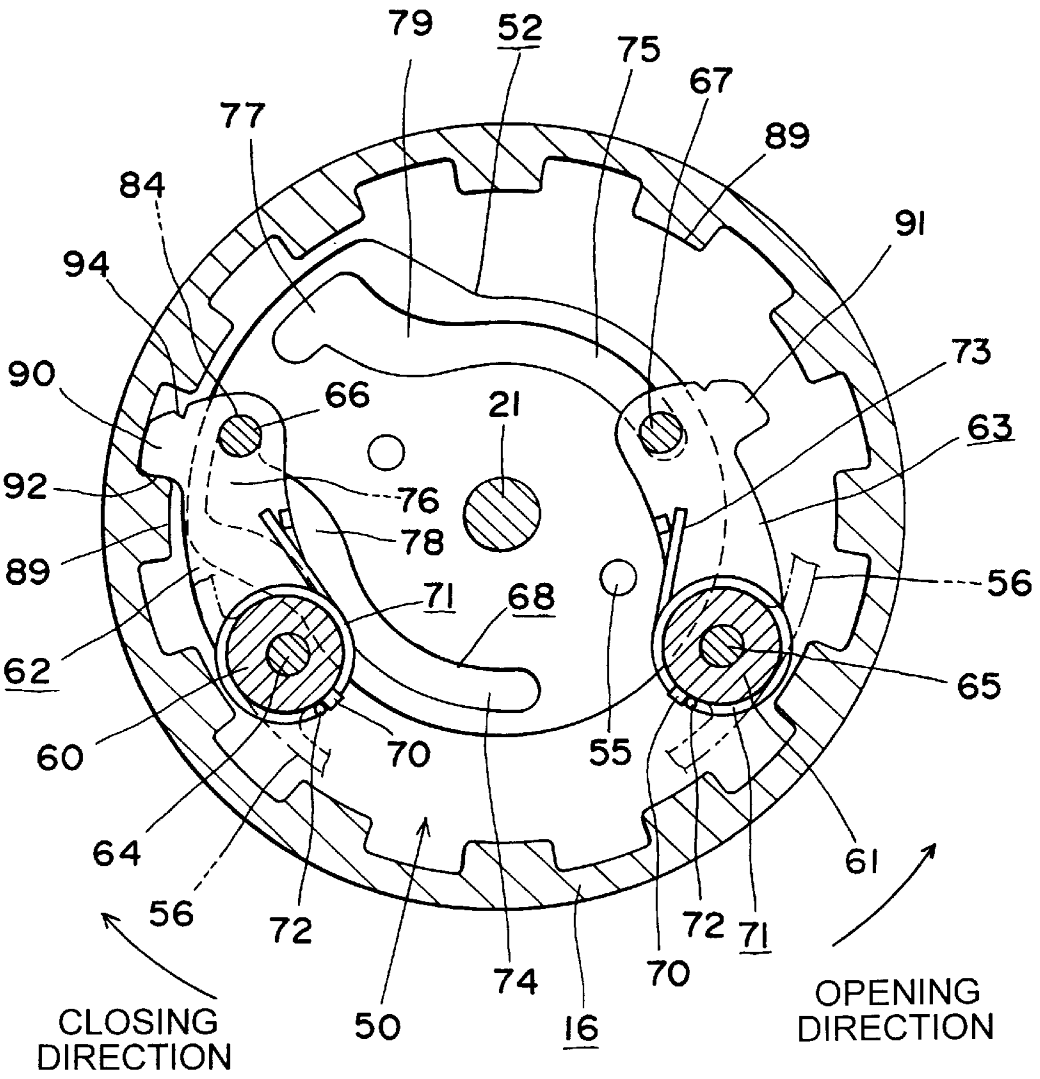
FIG. 19 is an explanation illustration showing a second coupled state of the clutch mechanism.

Furthermore, when rotating the guide plate 52 in the opening direction in FIG. 9 by the opening rotation of the motor 15, the other clutch arm 62 is swung in the direction of the arrow A, and as shown in FIG. 19, the coupling face 92 of the other clutch pawl 90 is then engaged with the projection 89, thereby the wire drum 16 is rotated in the opening direction. This state where the coupling face 92 of the other clutch pawl 90 is engaged with the projection 89, is the second coupled state of the clutch mechanism 50.

(Brake State of Clutch Mechanism 50)

When an external force in a direction of accelerating the door 12 is applied to the door which is being slid by the power of the motor 15, the door 12 is intended to slide at an over speed exceeding the predetermined speed which has been scheduled by the motor 15 and the reduction mechanism 54. Almost all of such external forces are applied to the door 12 by the inclination of the vehicle body 11. The external force applied to the door 12 is inevitably transmitted to the wire drum 16 through the wire cable 17.

Figure 16:
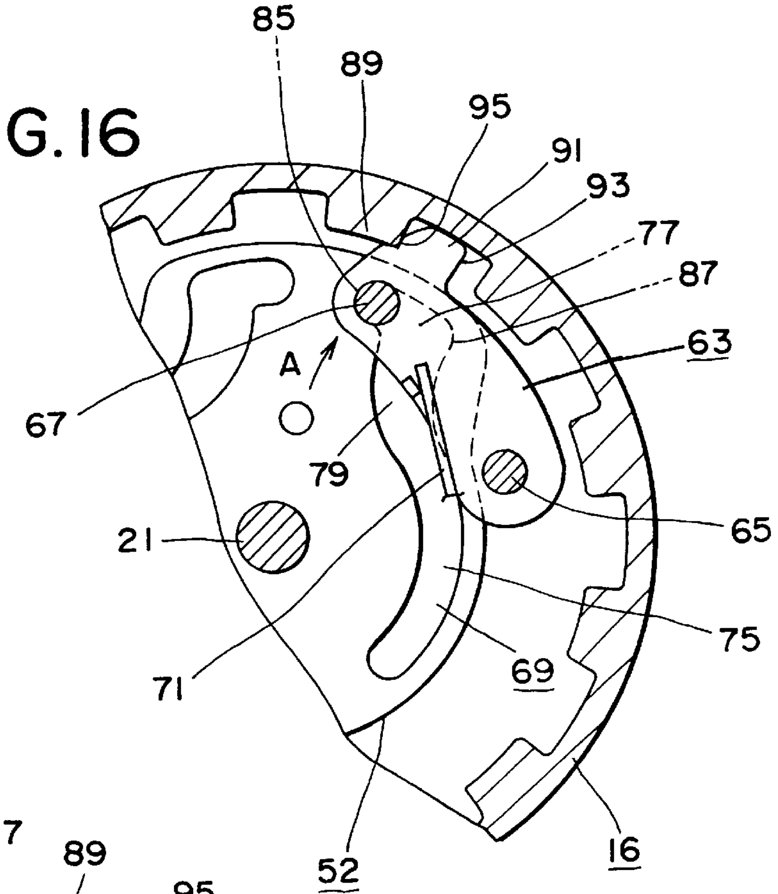
FIG. 16 is an explanation illustration showing the mid way where the clutch mechanism is displaced from the first coupled state to a first brake state.
Figure 17:
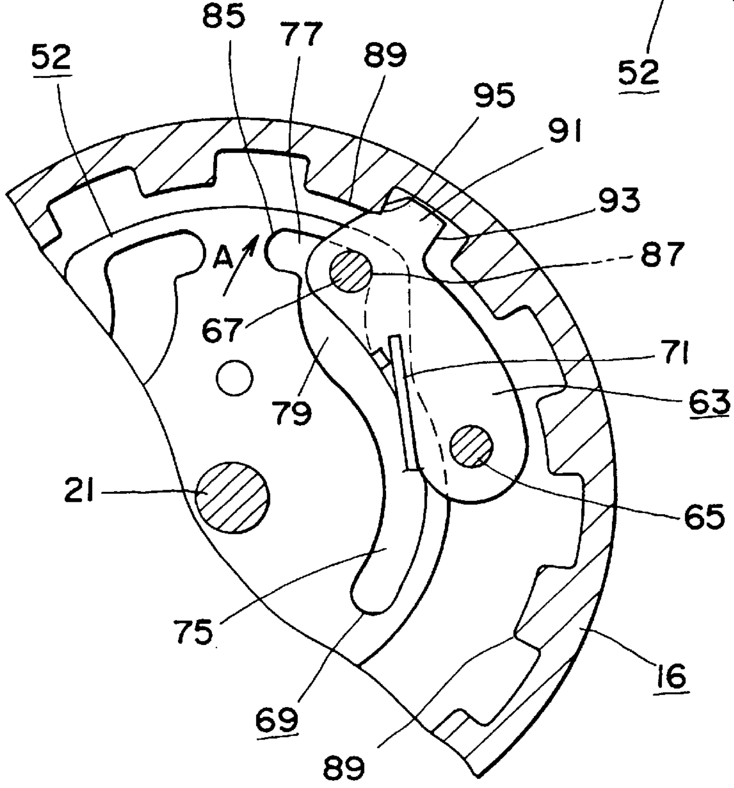
FIG. 17 is an explanation illustration showing the first brake state of the clutch mechanism.

For example, in the first coupled state (FIG. 15) of the clutch mechanism 50 for sliding the door 12 in the closing direction, if the external door-accelerating force is applied to the slide door 12, the drum 16 is rotated in the closing direction by the external force faster than the guide plate 52 which is being rotated at the predetermined speed in the closing direction by the power of the motor 15. Then, as shown in FIG. 16, another projection 89 of the drum 16 catches up with and comes into contact with the brake dent 95 of the clutch pawl 91, and rotates the clutch arm 63 and the clutch plate 56 in the closing direction around the drum shaft 21 at the over speed, thereby the slide pin 67 of the clutch arm 63 is pushed out of the engaging portion 85 of the outer slot 77, and the slide pin 67 is then moved in the outer slot 77 to come into contact with the contact face 87 of the outer slot 77 as shown in FIG. 17. During this moment, although the clutch arm 63 is urged in the direction opposite to the arrow A by the elasticity of the spring 71, the clutch arm 63 does not swing in the opposite direction since the brake dent 95 is engaged with the projection 89.

As shown in FIG. 17, when the slide pin 67 comes into contact with the contact face 87 of the outer slot 77, the external door-accelerating force is transmitted to the guide plate 52 through the slide pin 67. However, since the guide plate 52 is coupled with to the reduction mechanism 54 of the motor 15, the plate 52 cannot be rotated at a speed over the predetermined speed, thereby the braking resistance is applied to the slide door 12 by the guide plate 52 (reduction mechanism 54), whereby the slide door 12 is slid at the same predetermined speed as the guide plate 52. Thus, the state where the over speed of the slide door 12 in the closing direction is restricted by the engagement of the projection 89 and the brake dent 95 is the first brake state of the clutch mechanism 50.

Similarly, in the second coupled state (FIG. 19) of the clutch mechanism 50 for sliding the door 12 in the opening direction, if the external door-accelerating force is applied to the slide door 12, the projection 89 is engaged with the brake dent 94 of the clutch arm 62, thereby the slide door 12 is held at the predetermined speed. This state is the second brake state of the clutch mechanism 50.

As mentioned above, if the external door-accelerating force acts on the slide door 12, the clutch mechanism 50 of the first embodiment is displaced from the coupled state to the brake state to hold the sliding speed of the door 12 constant.

(Cushion 88 of Guide Plate 52)

The shock caused when the clutch mechanism 50 shifts from the coupled state to the brake state and the slide pins 66, 67 come into contact with the contact faces 86, 87 of the outer slots 76, 77, is absorbed by cushions 88 attached to the contact faces 86, 87. Accordingly, even if the magnitude of the external accelerating force applied to the slide door 12 is large, the generation of noise is depressed, and further, the durability of the guide plate 52 is also improved.

(Return of Clutch Mechanism 50 to Uncoupled State from Coupled State by Motor 15)

The clutch mechanism 50 of the first embodiment can be returned from the coupled state to the uncoupled state by rotating the motor 15 in a reverse direction for a predetermined time or by a predetermined amount F.

When reversing the motor 15 so as to rotate the guide plate 52 in the opening direction while the clutch mechanism 50 is being in the first coupled state shown in FIG. 15 by the closing rotation of the motor 15, the engaging portion 85 of the outer slot 77 is separated from the slide pin 67 of the clutch arm 63. Consequently, the clutch arm 63 is swung in the opposite direction of the arrow A by the elasticity of the spring 71, and the slide pin 67 then comes into contact with the inside wall 81 of the communication slot 79, and thereafter, the slide pin 67 is moved toward the inner slot 75 in the communication slot 79. The slide pin 67 is restored to the inner slot 75 as shown in FIG. 9 when the guide plate 52 is stopped by the completion of the reverse rotation of the motor 15 in the predetermined amount F, thereby the clutch mechanism 50 is returned to the uncoupled state. The restoring from the second coupled state to the uncoupled state of the clutch mechanism 50 can also be performed under the same principle.

Figure 18:
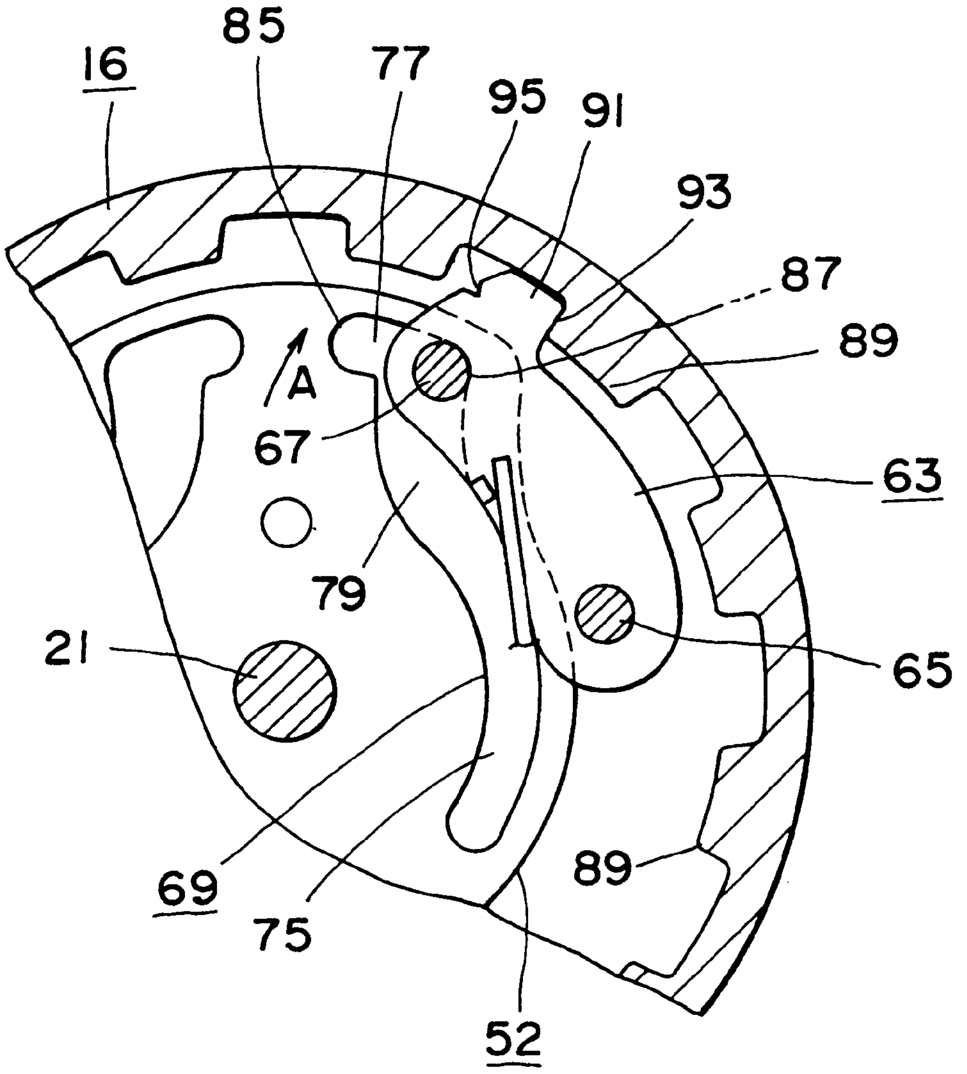
FIG. 18 is an explanation illustration showing the moment of release of the first brake state.

Incidentally, even if the clutch mechanism has no spring 71, the clutch mechanism 50 can be returned from the coupled state to the uncoupled state by the motor 15. That is, the slide pin 67 which has been released from the engaging portion 85 of the outer slot 77 is moved in the outer slot 77 without swinging when there is no spring 71 or when the spring is out of order, and the slide pin 67 comes into contact with the contact face 87 of the outer slot 77 (refer to FIG. 18). After that, the slide pin 67 is moved in the opposite direction of the arrow A due to the contact with the contact face 87 since the brake dent 95 is not engaged with the projection 89, and the slide pin 67 is guided toward the inner slot 75 by the communication slot 79. When the guide plate 52 is stopped by the completion of the reverse rotation of the motor 15 in the predetermined amount F, the slide pin 67 is restored to the inner slot 75 as shown in FIG. 9, thereby the clutch mechanism 50 is returned to the uncoupled state.

In principle, the controller 96 performs the restoring operation for reversing the motor 15 in the predetermined amount F so as to restore the clutch mechanism 50 to the uncoupled state when the sliding movement of the slide door 12 by the motor 15 is finished.

(Return of Clutch Mechanism 50 to Uncoupled State from Brake State by Motor 15)

The clutch mechanism 50 of the first embodiment can be shifted from the brake state to the uncoupled state through the coupled state by the power of the motor 15.

In the first coupled state (FIG. 15) of the clutch mechanism 50 for sliding the door 12 in the closing direction, if the external door-accelerating force is applied to the slide door 12, the clutch mechanism 50 is displaced to the first brake state shown in FIG. 17. At this time, it is unnecessary for the controller 96 to judge whether the clutch mechanism 50 is in the first coupled state or in the first brake state. That is, in order to restore the clutch mechanism 50 to the uncoupled state, the controller 96 performs the operation for reversing the motor 15 in the predetermined amount F in any state. When rotating the motor 15 in the reverse (opening) direction in the first brake state, the guide plate 52 is rotated in the opening direction, and the opening rotation of the plate 52 is immediately transmitted to the wire drum 16 by the engagement between the brake dent 95 and the projection 89, thereby the load current of the motor 15 is detected by the ampere meter 97 before the completion of the reverse rotation in the predetermined amount F of the motor 15. Thus, the quick detection of the motor load by the reverse rotation of the motor 15 can make the controller 96 consider that the clutch mechanism 50 is in the first brake state. To the contrary, as the reverse rotation in the predetermined amount F of the motor 15 does mot rotate the drum 16 in the first coupled state of the clutch mechanism 50, the load of the motor 15 is not detected. Accordingly, when the reverse rotation of the motor 15 is completed without the detection of the load of the motor 15, the restoring operation of the controller 96 is finished.

When the load of the motor 15 is detected by the reverse rotation (opening rotation) of the motor, the controller 96 immediately rotates the motor 15 in the closing direction. Then, the guide plate 52 is rotated, in FIG. 17, in the closing direction, and the engaging portion 85 of the outer slot 77 is engaged with the slide pin 67 as shown in FIG. 16, thereby the clutch arm 63 is rotated in the closing direction about the drum shaft 21 as a center. After that, the coupling face 93 of the clutch pawl 91 is brought into contact with the projection 89, and the clutch mechanism 50 is shifted to the first coupled state shown in FIG. 15. During this moment, the wire drum 16 does not rotate, so that a substantial load is not applied to the motor 15. However, when the guide plate 52 is further rotated in the closing direction in the first coupled state, a load for rotating the wire drum 16 is applied to the motor 15 at once. As this (second) load is detected by the ampere meter 97, the controller 96 can consider that the clutch mechanism 50 has been shifted from the first brake state to the first coupled state, and therefore the controller 96 rotates the motor 15 at once in the opening direction in the predetermined amount F. Consequently, the clutch mechanism 50 is returned to the uncoupled state. Thus, by repeatedly changing the rotational direction of the motor 15, the clutch mechanism 50 is returned to the uncoupled state through the first coupled state from the first brake state. The restoring from the second brake state to the uncoupled state of the clutch mechanism 50 can also be performed under the same principle.

(Return of Clutch Mechanism 50 to Uncoupled State from Brake State by Manual Power)

The clutch mechanism 50 of the first embodiment can be restored from the brake state to the uncoupled state by manual power, even if the motor 15 breaks down.

In the first brake state (FIG. 17) of the clutch mechanism 50, if the motor 15 breaks down, the wire drum 16 cannot be rotated in the closing direction due to the contact between the slide pin 67 of the clutch arm 63 and the contact face 87 of the outer slot 77. However, the drum 16 can be rotated in the opening direction. Therefore, the slide door 12 is caused to be slid in the opening direction by the manual power to rotate the wire drum 16 in the opening direction in FIG. 17 through the wire cable 17, thereby the projection 89 is disengaged from the brake dent 95. Then, the slide pin 67 is returned to the communication slot 79 by the elasticity of the spring 71 and comes into contact with the inside wall 81, since the clearance B at the tip of the communication slot 79 is wide. Consequently, the clutch pawl 91 of the clutch arm 63 is disengaged from the projection 89. In this state, the slide pin 67 is not engaged with the inner slot 75, but this state can also be considered as the uncoupled state of the clutch mechanism 50, since neither the closing rotation nor the opening rotation of the drum 16 is transmitted to the motor 15 (reduction mechanism 54).

Thus, in the clutch mechanism 50 of the present invention, even if the motor 15 breaks down, the clutch mechanism 50 can be restored from the brake state to the uncoupled state, only by sliding the door 12 using the manual power. Furthermore, since the clutch arm 63 is urged in the opposite direction of the arrow A by the elasticity of the spring 71, the clutch pawl 91 can be prevented from being unintentionally engaged with the drum 16, again. The restoring from the second brake state to the uncoupled state of the clutch mechanism 50 can also be performed under the same principle.

Incidentally, even if there is no spring 71, the clutch mechanism 50 can be restored from the brake state to the uncoupled state by the manual power. When the projection 89 is disengaged from the brake dent 95 by the opening rotation of the drum 16 while there is no spring 71 or the spring 71 is out of order, the clutch arm 63 remains where it is. Therefore, the drum 16 is caused to be further rotated in the opening direction by sliding the door 12 in the opening direction so as to press the coupling face 93 of the clutch pawl 91 by another projection 89 (refer to FIG. 18), and this causes the clutch arm 63 to rotate in the opposite direction of the arrow A. Consequently, the clutch mechanism 50 is restored to the uncoupled state.

(Return of Clutch Mechanism 50 to Uncoupled State from Coupled State by Manual Power)

The clutch mechanism 50 of the first embodiment can be restored from the coupled state to the uncoupled state through the brake state by the manual power if the motor 15 is out of order.

When the clutch mechanism 50 is in the first coupled state (FIG. 15), if the motor 15 breaks down, the wire drum 16 cannot be rotated in the opening direction due to the engagement between the slide pin 67 of clutch arm 63 and the engaging portion 85 of the outer slot 77. However, the drum 16 can be rotated in the closing direction. Therefore, the slide door 12 is caused to be slid in the closing direction by the manual power to rotate the wire drum 16 in the closing direction in FIG. 15 through the wire cable 17, and consequently, the clutch mechanism 50 is shifted to the fist brake state in FIG. 17 through the state shown in FIG. 16.

When the clutch mechanism 50 becomes in the first brake state, the slide door 12 becomes unmovable due to the contact between the slide pin 67 of the clutch arm 63 and the contact face 87 of the outer slot 77. When the slide door 12 has become unmovable, the door 12 is caused to be slid in the opening direction by the manual power to disengage the projection 89 from the brake dent 95, and thereby the clutch arm 63 is restored in the opposite direction of the arrow A by the elasticity of the spring 71, whereby the clutch mechanism 50 is returned to the uncoupled state. The restoring from the second coupled state to the uncoupled state of the clutch mechanism 50 can also be performed under the same principle.

The sliding distance G of the door 12 which is required when restoring the clutch mechanism 50 from the coupled state to the uncoupled state by the manual power has the following relation:

G=Distance D between projections 89−Width E of clutch pawl 91+Moving distance C of slide pin 67 in outer slot 77

This concept of the sliding distance G is important when understanding the relation between the slide door 12 and the full-open section, and the details will be described later in the column of "Full-Open Holding Function".

EMERGENCY RELEASE MECHANISM OF CLUTCH MECHANISM

The method of restoring the clutch mechanism 50 from the coupled state or the brake state to the uncoupled state by sliding the door 12 with the manual power, has already been described above, but this method cannot be used in some cases, depending on a position where the slide door 12 stops. Because the door 12 cannot be slid by the manual power for releasing the clutch mechanism 50 at times when the door 12 is fully closed or when the door 12 is fully opened.

On account of the above reasons, the powered sliding device 10 according to the present invention is provided with an emergency release mechanism 110, as shown in FIGS. 20, 21, for restoring the clutch mechanism 50 from the coupled state and the brake state to the uncoupled state. The emergency release mechanism 110 comprises a removable gear 112 which is provided between a reduction gear 111 of the reduction mechanism 54 and the output gear 51 attached to the drum shaft 21. The removable gear 112 is the final gear of the reduction mechanism 54. The removable gear 112 is rotatably and slidably mounted on an elongated shaft 113 fixed to the base plate 18. A large-diameter head 114 is formed at one end of the elongated shaft 113, and a spring 115 is provided between the head 114 and the removable gear 112. The removable gear 112 is held at a position of being engaged with both the reduction gear 111 and the output gear 51 by the elasticity of the spring 115. An operating knob 116 is attached to the removable gear 112. The operating knob 116 comprises two to four pieces of engaging leg portions 118 which are inserted into engaging holes 117 of the removable gear 112.

Next, the operation of the emergency release mechanism 110 will be described. When pulling the operating knob 116 in a direction of the arrow H, the removable gear 112 is moved against the elasticity of the spring 115 as shown in FIG. 21 due to the engagement between the leg portions 118 and the holes 117, and the engagement between the removable gear 112 and the reduction gear 111 is then released while the engagement between the removable gear 112 and the output gear 51 is held. Therefore, if the removable gear 112 is separated from the reduction mechanism 54, the output gear 51 can easily be rotated by the rotation of the operating knob 116 with the manual power. The rotation of the output gear 51 with the manual power brings about the same effect as the rotation of the output gear 51 with the motor 15, and the clutch mechanism 50 can be restored from the coupled state and the brake state to the uncoupled state, without moving the slide door 12.

FUNCTION OF HOLDING DOOR AT FULL-OPEN POSITION

As shown in FIG. 1, a full-open holder 130 for holding the slide door 12 at the full-open section is attached to the guide rail 14 of the vehicle body 11. Various types of the full-open holder are well known. In the present invention, an elastic member such as a bent leaf spring, an elastic rubber, or a roller having spring elasticity is used as the full-open holder 130. When sliding the door 12 in the opening direction, the appropriate portion of the door 12 is brought into contact with the holder 130 having the elasticity, and then the door 12 gets over the holder 130, elastically deforming the holder upon the further opening movement of door 12, thereafter the door is brought into contact with the vehicle body 11 at the mechanical open end, thereby the slide door 12 is held in the full-open section by the elastically restored holder 130. Here, the full-open section means the section between the center (dead point) of the holder 130 and the mechanical open end, and it has a width J of several centimeters. The holder 130 can also be attached to the slide door 12.

The full-open holder 130 has an inexpensive and simple structure, but the holding force thereof is not so strong, since it holds the slide door 12 in the full-open section by utilizing the elasticity of the leaf spring or the like. Generally, it is difficult for the holder 130 to resist the external force (gravity) which acts on the door 12 when the vehicle body 11 is inclined at a grade of more than 10%.

Therefore, in the present invention, the weak points of the full-open holder 130 are covered by making the clutch mechanism 50 have a function of holding the door 12 at the full-open section. In order to make the clutch mechanism 50 have the full-open holding function, it is sufficient to set the relation between the width J of the full-open section and the predetermined rotational amount F of the motor 15 for restoring the clutch mechanism 50 to the uncoupled state, as follows:

Width J>Moving Distance K of Door 12 (K=Distance that the door can move by the rotation of the motor 15 in the predetermined amount F)

If this relation is set, to be described next, the clutch mechanism 50 is held in the second coupled state and is not restored to the uncoupled state, even if the motor 15 is rotated in the reverse direction in the predetermined amount F after the door 12 has moved to the mechanical open end in the state where the vehicle body 11 is considerably inclined. Since the clutch mechanism 50 in the second coupled state can transmit the closing rotation of the wire drum 16 to the motor 15, the movement of the door 12 in the closing direction is prevented, and thereby the door 12 is held in the full-open section.

That is, the clutch mechanism 50 is in the second coupled state (FIG. 19) when opening the door 12 on a steep downhill slope, and a heavy load caused by the inclination acts on the motor 15. When the door 12 gets over the full-open holder 130 and comes into contact with the vehicle body 11 at the mechanical open end due to the opening movement of the door 12, the controller 96 rotates the motor 15 in the closing direction in 23, the predetermined amount F for restoring the clutch mechanism 50 to the uncoupled state, and thereby the guide plate 52 is rotated in the closing direction in FIG. 19. At this time, since a strong external force in the closing direction acts on the door 12 due to the inclination, upon the closing rotation of the guide plate 52, the wire drum 16 is simultaneously rotated in the closing direction, following up the guide plate 12. Therefore, the clutch mechanism 50 is continuously held in the second coupled state as long as the wire drum 16 is rotated in the closing direction, following up the guide plate 52.

The closing rotation of the wire drum 16 together with the guide plate 52 permits the slide door 12 to move toward the full-open holder 130 from the mechanical open end. At this time, when the relation between the moving distance K and the width J is set as the above description, even if the motor 15 is rotated in the closing direction in the predetermined amount F, the door 12 does not substantially come into contact with the full-open holder 130. If the door 12 comes into strong contact with the holder 130 by the reverse rotation of the motor, the external force in the closing direction which has acted on the door 12 is weakened by the resistance generated by the contact between the holder 130 and the door, and thereby there is a possibility that the clutch mechanism 50 may be restored from the second coupled state to the uncoupled state.

The clutch mechanism 50 is held in the second coupled state after the rotation of the motor 15 in the predetermined amount F has been completed. The clutch mechanism 50 in the second coupled sate does not allow the closing rotation of the wire drum 16, and accordingly, even if the vehicle body 11 is inclined at a grade exceeding approximately 10%, the door 12 is surely held in the full-open section.

To close the door 12 which is held in the full-open section by the clutch mechanism 50 in the second coupled state by the manual power, the door 12 is caused to be slid toward the mechanical open end before sliding the door 12 in the closing direction. Then the clutch mechanism 50 is shifted to the second brake state, and thereafter the door 12 is caused to be slid in the closing direction, thereby the clutch mechanism 50 is returned to the uncoupled state. This operation requires the sliding movement of the door 12 in the opening direction at the distance G. Therefore, the distance G is made to be shorter than the moving distance K of the door 12.

When the inclination of the vehicle body 11 is not steep, the clutch mechanism 50 is restored from the second coupled state to the uncoupled state by the rotation of the motor 15 in the predetermined amount F. At this time, the full-open holder 130 should hold the door 12 in the full-open section.

LATCH ASSEMBLY

Figure 22:
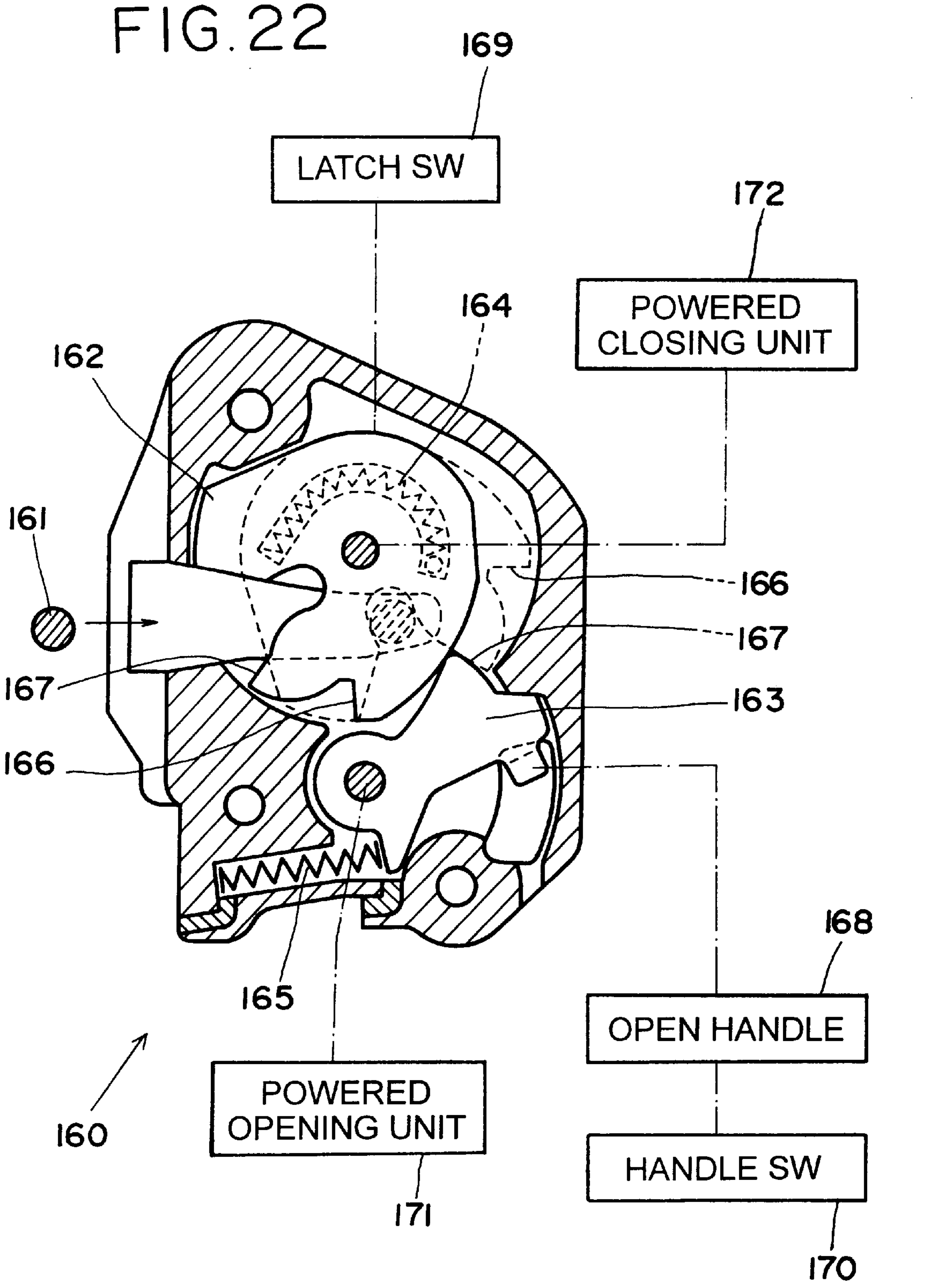
FIG. 22 is a cross sectional view of a latch assembly attached to a slide door of the vehicle.

The slide door 12 is provided with a latch assembly 160 for holding the door 12 in a door-closed state. As shown in FIG. 22, the latch assembly 160 comprises a latch 162 which is engageable with a striker 161 (FIG. 1) fixed to the vehicle body 11 and a ratchet 163 which is engageable with the latch 162. The latch 162 is urged in the clockwise direction by the elasticity of a latch spring 164, and the ratchet 163 is urged in the counterclockwise direction by the elasticity of a ratchet spring 165. When moving the door 12 in the closing direction, the latch 162 comes into contact with the striker 161, and rotates from an unlatched position shown by the solid line through a half-latched position where the ratchet 163 is engaged with a half-latch step portion 166 of the latch 162 to a full-latched position where the ratchet 163 is engaged with a full-latch step portion 167 of the latch 162. When the latch 162 reaches the full-latched position, the door 12 is fully closed. The ratchet 163 is released from the latch 162 by the operation of an opening handle 168 of the door 12. The latch assembly 160 further comprises a latch switch 169 for detecting the positions of the latch 162, a handle switch 170 for detecting the actuation of the opening handle 168, a powered opening unit 171 for disengaging the ratchet 163 from the latch 162, and a powered closing unit 172 for rotating the latch 162 from the half-latched position to the full-latched position.

Next, the operation of the latch assembly will be described. When sliding the door 12 in the closing direction by the rotation of the motor 15 of the powered sliding device 10, the latch 162 is rotated into the half-latched position due to the contact with the striker 161, and this position of the latch is detected by the latch switch 169. Upon the completion of the half-latched position of the latch 162, the controller 96 performs the restoring operation for restoring the clutch mechanism 50 to the uncoupled state, and then stops the actuation of the powered sliding device 10. At the same time, the controller 96 operates the powered closing unit 172 to rotate the latch 162 from the half-latched position to the full-latched position so as to fully close the slide door 12. When the latch switch 169 detects the full-latched position, the controller 96 stops the actuation of the closing unit 172, and at the same time, the controller 96 rotates the motor 15 of the powered sliding device 10 in the opening direction for a predetermined time or until the ampere meter 97 detects a substantial load of the motor 15 in order to displace the clutch mechanism 50 from the uncoupled state to the second coupled state (FIG. 19). Thus, when the slide door 12 is fully closed, the controller 96 makes the clutch mechanism 50 in the second coupled state for the opening operation.

In the above closed state, when the opening handle 168 of the slide door 12 is operated, the ratchet 163 is disengaged from the latch 162, and the slide door 12 is pushed out in the opening direction by the elasticity of a rubber seal provided between the slide door 12 and the vehicle body 11. At the same time, the actuation of the opening handle 168 is detected by the handle switch 170, thereby the controller 96 rotates the motor 15 of the powered sliding device 10 in the opening direction to slide the door 12 in the opening direction. At this time, even if a strong external force in the opening direction is applied on the slide door 12 due to the inclination of the vehicle body 11, the over speed movement of the slide door 12 is immediately prevented. Because the clutch mechanism 50 is immediately shifted to the second brake state by the strong external force since the clutch mechanism 50 has been previously shifted to the second coupled state (FIG. 19).

The timing of shifting the clutch mechanism 50 to the second coupled state in advance can be changed by releasing the mechanical coupling between the opening handle 168 and the ratchet 163. In this case, the clutch mechanism 50 is held in the uncoupled state until the actuation of the opening handle 168 is detected by the handle switch 170, and the clutch mechanism 50 is caused to be shifted to the second coupled state when the operation of the opening handle 168 is detected. The controller 96 operates the powered opening unit 171 to disengage the ratchet 163 from the latch 162 upon the completion of the second coupled state of the clutch mechanism 50, and thereafter the controller 96 rotates the motor 15 of the powered sliding device 10 in the opening direction.

DOOR POSITION DETECTING MECHANISM

As shown in FIG. 8, the cover plate 19 is provided with an optical sensor 140 for measuring the rotational speed of the wire drum 16, the rotational amount of the drum, and the rotational direction of the drum. A disk 141 is attached to the wire drum 16. A lot of measuring slits 154 are formed in an outer portion of the disk 141 which passes through a measuring section 142 of the optical sensor 140. When the disk 141 is rotated, the optical sensor 140 detects the measuring slits 154, and outputs the pulse signal to the controller 96 (FIG. 14), thereby the controller 96 can confirm the rotational speed of the drum 16 (the sliding speed of the door 12), the rotational amount of the drum 16 (the moving distance of the door 12), and the rotational direction of the drum 16 (the sliding direction of the door 12).

Figure 23:
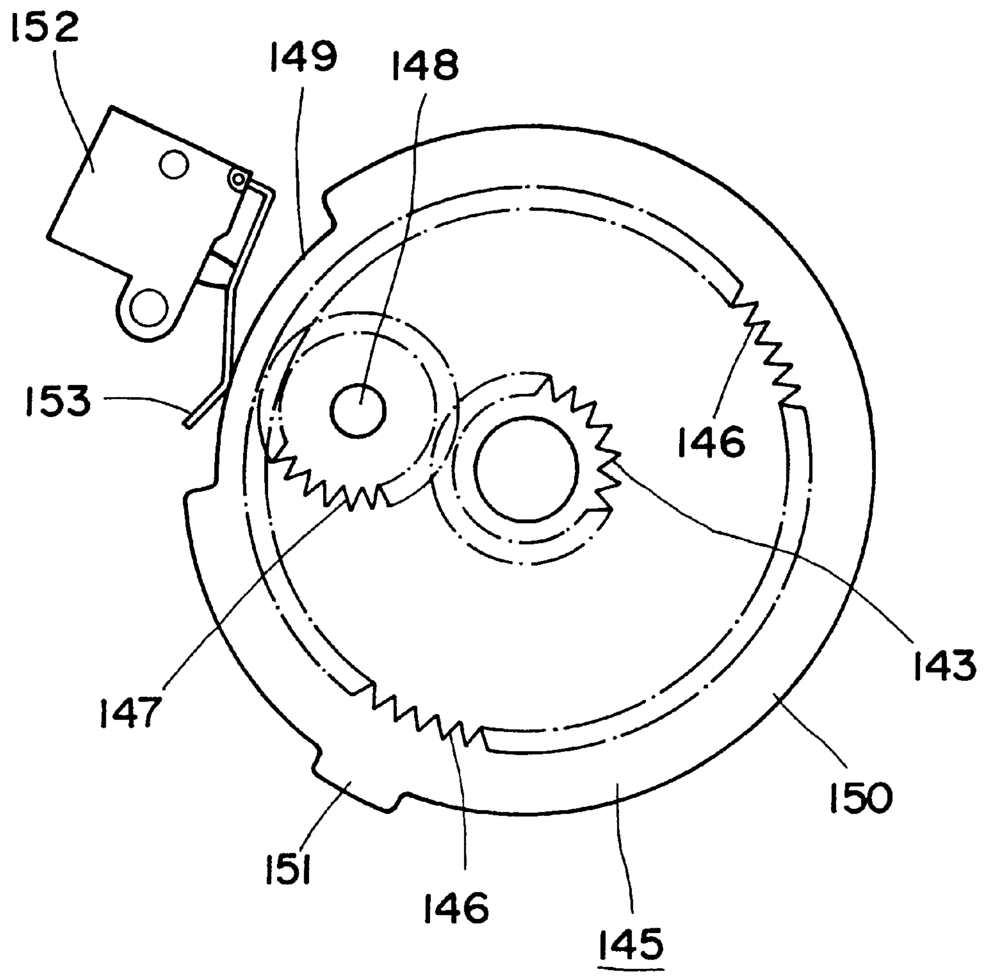
FIG. 23 is a front view showing a optical sensor of the sliding device.

As shown in FIGS. 8 and 23, a small diameter central gear 143 is attached to one end portion of the drum shaft 21. The central gear 143 is rotated at the same speed as the wire drum 16. A large diameter cam gear 145 is rotatably mounted on a boss portion 144 of the central gear 143. The cam gear 145 has an internal toothed portion 146 on an outer flange thereof. An intermediate gear 147 is mounted to the cover plate 19 by a pin 148. The intermediate gear 147 is engaged with both the central gear 143 and the internal toothed portion 146. The rotation of the central gear 143 is transmitted to the cam gear 145 through the intermediate gear 147. While the slide door 12 is slid, in general, throughout the total section between the full-latched position and the mechanical open end by about two times the rotation of the drum 16, the cam gear 145 is made to slow down by the gears 143, 147 so as not to rotate once or more even if the door 12 is slid throughout the total section.

As shown in FIG. 23, on the peripheral surface of the outer flange of the cam gear 145 are formed three cam faces 149, 150 and 151 which respectively have different distances from the drum shaft 21. A cam switch 152 for detecting the cam faces 149, 150, 151 is attached to the cover plate 19. A switch arm 153 of the cam switch 152 touches the small diameter cam face 149 when the door 12 is in an enlarged open section, and it touches the large diameter cam face 151 when the door 12 is in an enlarged closed section, and it touches the medium diameter cam face 150 when the door 12 is in the rest semi-open section.

Next, the operation of the door position detecting mechanism using the optical sensor 140 and the cam gear 145 will be described.

When the slide door 12 is in the enlarged open section, the switch arm 153 of the cam switch 152 comes into contact with the small diameter cam face 149 of the cam gear 145, thereby the controller 96 can confirm that the door 12 is in the enlarged open section. As the door 12 is in the enlarged open section, the controller 96 stops the electrical supply from the battery 98 to the optical sensor 140, and cuts the dark current in the waiting state of the optical sensor 140. The dark current of the optical sensor 140 is a heavy load for the battery 98.

When moving the door 12 from the full-open section toward the door-closed position by the closing rotation of the motor 15, the door 12 gets over the full-open holder 130, and the switch arm 153 is then in contact with the medium diameter cam face 150 of the cam gear 145, thereby the controller 96 confirms the leaving of the door 12 from the enlarged open section, and starts supplying the electric power of the battery 98 to the optical sensor 140. Then, the optical sensor 140 detects the measuring slit 154 of the disk 141 which is being rotated at the same speed as the drum 16, and outputs the pulse signal to the controller 96. Therefore, the controller 96 accurately confirms the sliding speed of the door 12, the moving distance of the door 12, and the sliding direction of the door 12.

When the door 12 is slid in the closing direction up to the beginning of the enlarged closed section, the switch arm 153 of the switch 152 touches the large diameter cam face 151 of the cam gear 145, thereby the controller 96 stops the electrical supply to the optical sensor 140 for cutting the dark current of the optical sensor 140.

When the switch arm 153 of the switch 152 detects the small diameter cam face 149 of the cam gear 145 by sliding the door 12 positioned in the full-open section in the closing direction with the manual power, the controller 96 starts supplying the electric power of the battery 98 to the optical sensor 140, and at the same time, rotates the motor 15 in the closing direction. Consequently, after that, the door 12 is slid in the closing direction by the power of the motor 15.

When moving the door 12 from the enlarged closed section toward the full-open section by the opening rotation of the motor 15, the switch arm 153 of the switch 152 comes into contact with the medium diameter cam face 150 of the cam gear 145, thereby the controller 96 confirms the leaving of the door 12 from the enlarged closed section, and supplies the electric power of the battery 98 to the optical sensor 140. The switch arm 153 touches the small diameter cam face 149 of the cam gear 145 when the slide door 12 is slid in the opening direction up to the beginning of the enlarged open section, and then the controller 96 reduces the sliding speed of the door 12, and stops the electrical supply from the battery 98 to the optical sensor 140. Consequently, the door 12 is brought into contact with the full-open holder 130 at a low speed, and gets over it, and reaches the full-open section. If the slide door 12 is made to slow down due to the detection of the small diameter cam face 149 of the switch 152, the damage of the full-open holder 130 can be reduced.

As mentioned above, since the cam gear 145 of the present invention does not rotate through one rotation or more even if the slide door 12 slides through the total section, both the cam face 149 for detecting the enlarged open section and the cam face 151 for detecting the enlarged closed section, can be formed on one piece of cam gear 145. Furthermore, since there is only one piece of cam gears 145, it is sufficient that the number of pieces of switches 152 is also one. Furthermore, since the cam gear 145 and the switch 152 can be previously attached to the powered sliding device 10, the signal cable for connecting the switch 152 to the controller 96 can be attached to the vehicle body, together with other cables for connecting the rest parts of the powered sliding device 10 to the controller 96, so that the assembly work may quickly and easily be performed.

MOTOR SWITCH

The powered sliding device 10 further comprises a motor switch 180 (FIG. 14) for operating the motor 15. The motor switch 180 is preferably provided at a position near the driver seat of the vehicle body 11 and is manually operated. The motor switch 180 has an opening position for rotating the motor 15 in the opening direction, a closing position for rotating the motor 15 in the closing direction, and a neutral position.

When the motor 15 is rotated in the closing direction or in the opening direction by the actuation of the motor switch 180, the slide door 12 is slid in the closing direction or in the opening direction, and when the motor switch 180 is turned off, the door 12 stops there. Accordingly, the actuation of the motor switch 180 permits the slide door 12 to be stopped at a desired position in the semi-open section. This is convenient when it is undesirable to largely open the door 12 because of a hard rain or a strong wind. The semi-open state of the slide door 12 is held by the clutch mechanism 50 as follows:

When the motor switch 180 is shifted to the open position in the door-closed state, the ratchet 163 is disengaged from the latch 162 by the powered opening unit 171, and the motor 15 is then rotated in the opening direction to slide the door 12 in the opening direction. During this moment, the clutch mechanism 50 becomes in the second brake state when the strong external force in the opening direction is applied to the door 12, and in other cases, it becomes in the second coupled state. As the door 12 has reached the desired position, the switch 180 is turned off to stop the motor 15. At this time, the controller 96 does not perform the restoring operation for returning the clutch mechanism 50 to the uncoupled state. Accordingly, the clutch mechanism 50 is left in the second coupled state (FIG. 19) or in the second brake state.

If the state of the clutch mechanism 50 is the second brake state, the opening rotation of the wire drum 16 is immediately transmitted to the motor 15. Accordingly, the door 12 is held in the desired position against the strong external force in the opening direction.

If the motor 15 has stopped while the clutch mechanism 50 is in the second coupled state, it is considered that an external force in the closing direction, or a weak external force in the opening direction, or no external force is applied to the door 12. If the external force in the closing direction is applied to the door 12, the external force in the closing direction is also applied to the wire drum 16, but in the second coupled state, the closing rotation of the wire drum 16 is immediately transmitted to the motor 15, and therefore, the door 12 is held in the desired position against the external force in the closing direction. If the weak external force in the opening direction is applied to the door 12, the door 12 is caused to be slid in the opening direction at an extremely short distance after the motor 15 has stopped, and thereby the clutch mechanism 50 is shifted to the second brake state, and thereafter the slide door 12 cannot be moved. Thus, after the slide door 12 has been moved to the desired position by the operation of the motor switch 180, the slide door 12 is substantially held in the desired position by the clutch mechanism 50.

However, if an exceptional operation of the motor switch 180 is performed, the clutch mechanism 50 would be shifted to the uncoupled state, and the door 12 may unintentionally be moved by the external force. One example of the exceptional operation is an instantaneous operation of the motor switch 180. The instantaneous operation of the motor switch 180 may rotate the motor 15 in the predetermined amount F, and this rotation in the amount F can shift the clutch mechanism 50 to the uncoupled state.

When the clutch mechanism 50 becomes in the uncoupled state by the exceptional operation of the motor switch 180, the wire drum 16 becomes free from the motor 15, and therefore, the slide door 12 may move from the desired position in the semi-open section. Therefore, in the present invention, when a movement of the slide door 12 over a predetermined amount is detected by the optical sensor 140 within a predetermined period from the turning-off of the motor switch 180, the controller 96 rotates the motor 15 in the closing direction or in the opening direction to shift the clutch mechanism 50 to the first coupled state or the second coupled state. Consequently, the unintentional movement of the slide door 12 is immediately restricted. A movement of the door 12 after the elapse of the predetermined period from the turning-off of the motor 15, may be brought about by the intention of the operator. Accordingly, the controller 96 does not perform the operation to restrict the movement of the door after the elapse of the predetermined period.

SAFETY OPERATION OF CONTROLLER

The safety operation of the controller 96 using the sliding seed of the slide door 12 measured by the optical sensor 140 and the current value of the motor 15 measured by the ampere meter 97, will be described.

A mechanically frictional resistance or a slide resistance is applied to the door 12 when the slide door 12 is slid relative to the vehicle body. This slide resistance is variable depending on the position where the slide door 12 is being slid. The slide resistance largely varies in the enlarged closed section and in the enlarged open section by the influence of the rubber seal, the full-open holder 130 or the like, but it is held approximately constant in the semi-open section. The safety operation in the present invention is especially used when the slide door 12 is being slid in the semi-open section.

A reference current value for the motor 15 used for the safety operation should be previously stored in the controller 96. The reference current value is slightly smaller than the current value which flows in the motor 15 when the door 12 is normally slid in the semi-open section in the condition where no external force in the door-accelerating direction and in the door-decelerating direction is applied to the slide door 12. Accordingly, in most cases, the current value of the motor 15 measured by the ampere meter 97 is over the reference current value.

When the slide door 12 is being slid in the semi-open section by the power of the motor 15 without having the external force in the door-accelerating direction, the clutch mechanism 50 is in the coupled state. At this moment, the current value of the motor 15 detected by the ampere meter 97 is over the reference current value. In this state, if an unexpected resistance generated by the contact of the door 12 with a human body or others is added to the slide door 12, this leads to the deceleration of the door 12, and this deceleration is detected by the optical sensor 140. In this way, when the slow down of the door 12 is detected while the current value is being larger than the reference current value, the controller 96 considers that the slide resistance has abnormally increased in the state where the clutch mechanism 50 is in the coupled state, and thereby the controller 96 stops the motor 15, or reverses the motor 15. Incidentally, the current value detected by the ampere meter 97 increases a little behind the detection of the deceleration by the optical sensor 140. However, this brings about no problem to the safety operation of the controller 96 since the current value is slightly larger than the reference value before the optical sensor 140 detects the deceleration of the door.

When the external force in the door-accelerating direction is applied to the door 12 while the clutch mechanism 50 is being in the coupled state, this causes the slide door 12 and the wire drum 16 to accelerate gradually, and the projection 89 of the drum 16 is then separated from the coupling face 92 or 93, and the clutch mechanism 50 becomes in the changeover state of shifting from the coupled state to the brake state. In this changeover state, while the sliding speed gradually increases, the current value of the motor 15 is sharply reduced by the decrease of the load of the motor 15 and becomes smaller than the reference current value. Then, another projection 89 of the drum 16 comes into contact with the brake dent 94 or 95 by the continuous over speed rotation of the wire drum 16 to move the slide pin 66 or 67, and thereby the clutch mechanism 50 is shifted to the brake state.

When the clutch mechanism 50 has been shifted to the brake state, the sliding speed of the slide door 12 sharply decreases. However, this is not a deceleration that is brought about by an abnormality or an accident. Therefore, the controller 96 does not consider, as an abnormal sliding movement, the deceleration of the door 12 which is detected within a predetermined period L measured from a time when the current value of the motor 15 became smaller than the reference current value. Furthermore, the controller 96 does not consider, as the abnormal sliding movement, the deceleration of the door 12 which is detected within the predetermined period L which includes the moment of changing of the sliding speed while the current value of the motor 15 is smaller than the reference current value.

When the unexpected resistance is applied to the slide door 12 while the clutch mechanism 50 is continuously being shifted to the brake state by the external force in the accelerating direction, this causes the door 12 to decelerate. Accordingly, the controller considers, as an abnormal sliding movement, the deceleration of the door 12 which is detected when the current value of the motor 15 is continuously smaller than the reference current value through the predetermined period L, and it stops or reverses the motor 15. Furthermore, the controller 96 can consider, as the abnormal sliding movement, the deceleration of the door 12 which is detected after the predetermined period L has elapsed without the change of the sliding speed while the current value of the motor 15 is smaller than the reference current value.

As mentioned above, in the safety operation of the controller according to the present invention, the abnormal sliding movement in the coupled state and the abnormal sliding movement in the brake state can quickly and surely be detected.

CLUTCH MECHANISM OF SECOND EMBODIMENT

Next, a clutch mechanism 50A of the second embodiment according to the present invention will be described with reference to FIGS. 25 to 32. The clutch mechanism 50A has a brake state similarly to the clutch mechanism 50 of the first embodiment. The feature of the clutch mechanism 50A is that the brake state and the coupled state of the clutch mechanism 50A is not shifted to the uncoupled state by the movement of the door 12 with the manual power. Therefore, the clutch mechanism 50A in the brake state and in the coupled state more surely holds the door 12 in the desired position.

Figure 25:
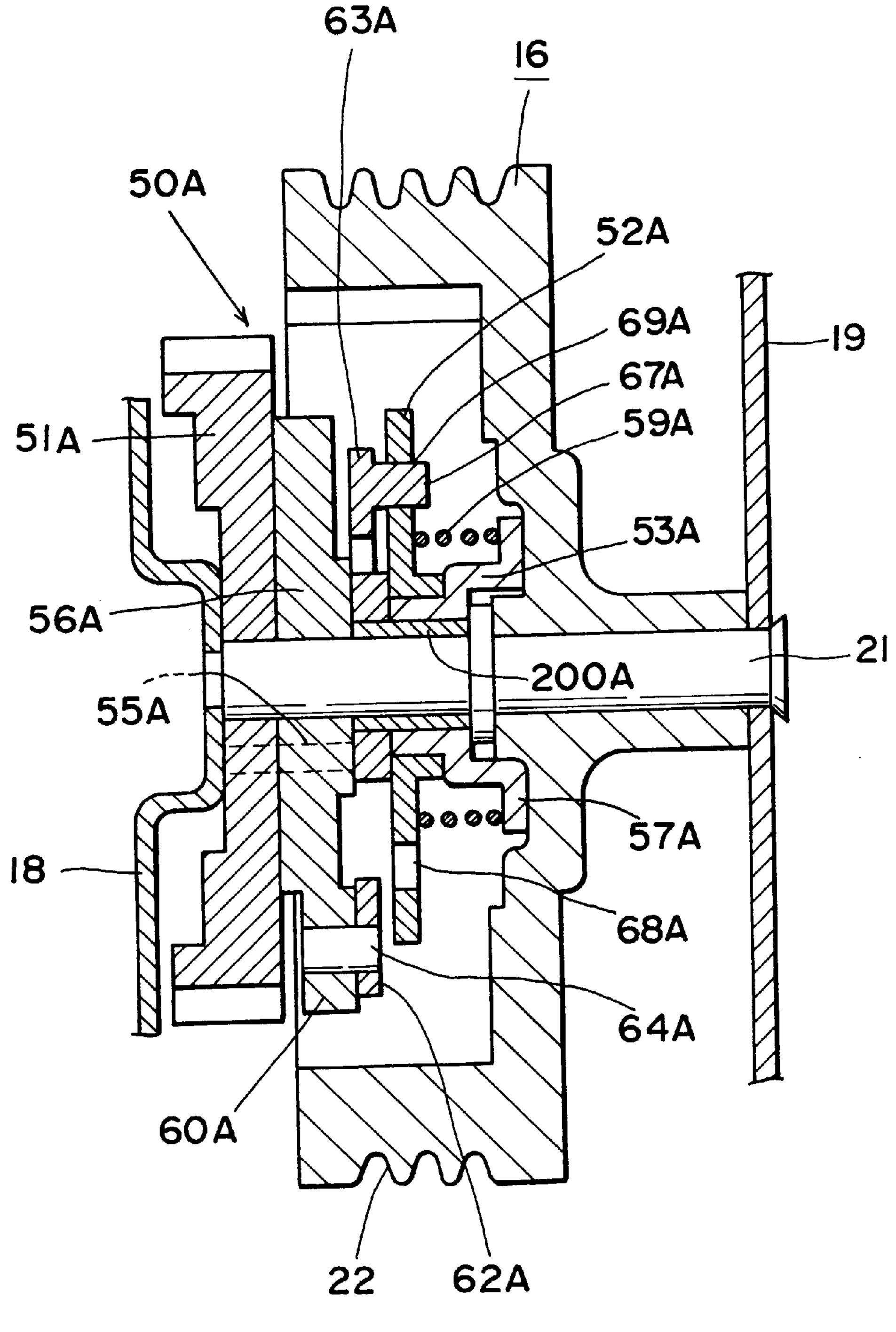
FIG. 25 is a vertical cross sectional side view of the sliding device having a clutch mechanism of a second embodiment according to the present invention.
Figure 26:
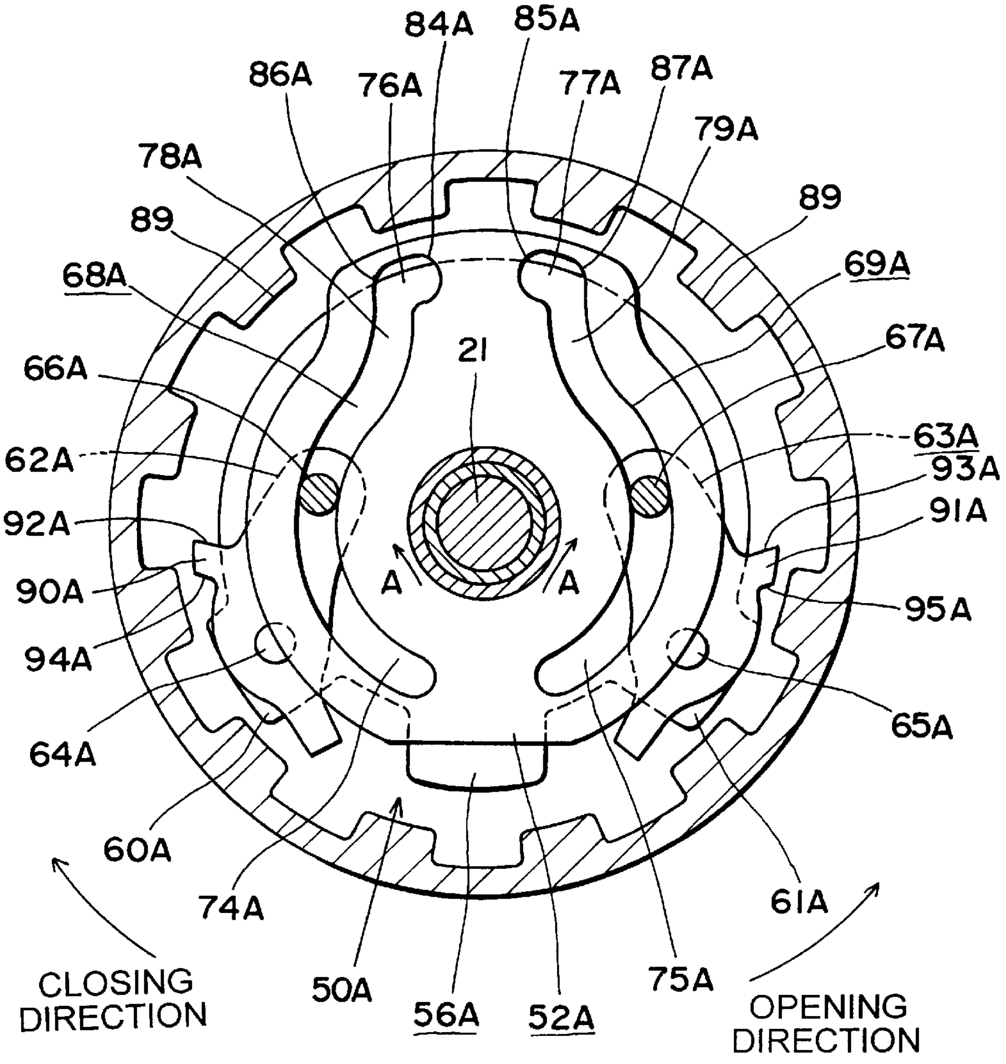
FIG. 26 is a vertical cross sectional view showing an uncoupled state of the clutch mechanism.

As shown in FIGS. 25 and 26, the clutch mechanism 50A of the second embodiment is substantially accommodated in the comparatively broad inside space of the wire drum 16. The clutch mechanism 50A has a first coupled state for transmitting the closing rotation of the motor 15 to the drum 16, a second coupled state for transmitting the opening rotation of the motor 15 to the drum 16, a first brake state for transmitting the closing rotation of the drum 16 to the motor 15, a second brake state for transmitting the opening rotation of the drum 16 to the motor 15, and an uncoupled state for transmitting neither the opening rotation nor the closing rotation of the drum 16 to the motor 15.

To the shaft 21 of the drum 16, an output gear or a clutch gear 51A, a disk-shaped clutch plate 56A, and a member 200A are respectively rotatably attached. The output gear 51A is engaged with the reduction mechanism 54 of the motor 15. The output gear 51A and the clutch plate 56A are coupled by a connect pin 55A to rotate as one piece. On the periphery of the member 200A, a sleeve 53A is rotatably attached, and on the periphery of the sleeve 53A, a disk-shaped guide plate 52A is rotatably attached. A spring 59A is provided between the guide plate 52A and a flange 57A of the sleeve 53A. The spring 59A applies a little rotational resistance to the guide plate 52A. The clutch plate 56A has, at the peripheral portion thereof, boss portions 60A, 61A to which clutch arms 62A, 63A are rotatably attached with shafts 64A, 65A, respectively. The clutch arms 62A, 63A respectively have at the tips thereof slide pins 66A, 67A which are slidably engaged with guide slots 68A, 69A formed in the guide plate 52A, respectively.

The guide slots 68A, 69A are horizontally symmetrical as shown in FIG. 28. The guide slots 68A, 69A respectively comprise circular arc-shaped inner slots 74A, 75A around the drum shaft 21 as a center, circular arc-shaped outer slots 76A, 77A around the shaft 21 as a center, and communication slots 78A, 79A for connecting the inner slots 74A, 75A and the outer slots 76A, 77A. Each width of the communication slots 78A, 79A is constant. One sides of the outer slots 76A, 77A are formed to be semi-circular engaging portions 84A, 85A, and the other sides are formed to be contact faces 86A, 87A which are connected to the outside walls of the communication slots 78A, 79A with no difference in level.

Onto the clutch arms 62A, 63A, clutch pawls 90A, 91A projecting toward the wire drum 16 are formed. One sides of the clutch pawls 90A, 91A are respectively formed to be coupling faces 92A, 93A substantially in parallel with the radial direction of the drum shaft 21. The other sides of the clutch pawls 90A, 91A are respectively formed to be brake faces 94A, 95A.

It is clear from the above description that the clutch arms 62A, 63A of the clutch mechanism 50A according to the second embodiment are mechanically coupled with the motor 15. This is the largest structural different point when compared with the clutch mechanism 50 of the first embodiment.

Next, the operation of the clutch mechanism 50A of the second embodiment will be described.

(Uncoupled State of Clutch Mechanism 50A)

As shown in FIG. 26, when the slide pins 66A, 67A of the clutch arms 62A, 63A pivotally mounted to the clutch plate 56A with the shafts 64A, 65A, are both located in the inner slots 74A, 75A formed at positions apart from the drum shaft 21 by a predetermined constant distance, the clutch pawls 90A, 91A of the clutch arms 62A, 63A are both separated from the projection 89 of the wire drum 16 so as to be disengaged therewith. This state where both clutch pawls 90A, 91A are together separated from the projection 89, is the uncoupled state of the clutch mechanism 50A.

(Coupled State of Clutch Mechanism 50A)

When rotating the motor 15 in the closing direction, the clutch plate 56A is also rotated in the closing direction in FIG. 26. At this time, since the rotational resistance is applied to the guide plate 52A by the elasticity of the spring 59A, the guide plate 52A are not rotated around the drum shaft 21 for a while. Then, the slide pins 66A, 67A of the clutch arms 62A, 63A are moved in the guide slots 68A, 69A of the guide plate 52A, and the slide pin 66A comes into the communication slot 78A from the inner slot 74A of the guide slot 68A, and is guided by the communication slot 78A to be gradually separated from the drum shaft 21, and thereby, the clutch arm 62A is swung in the direction of the arrow A around the shaft 64A. When the slide pin 66A has reached the outer slot 76A from the communication slot 78A, the clutch pawl 90A of the clutch arm 62A projects outermost and comes into the gap between the projections 89, 89 to engage with the engaging portion 84A of the outer slot 76A. During this moment, the other slide pin 67A is moved only in the circular arc-like inner slot 75A around the drum shaft 21 as a center, and therefore, the other clutch arm 63A does not move in the direction of the arrow A.

Figure 30:
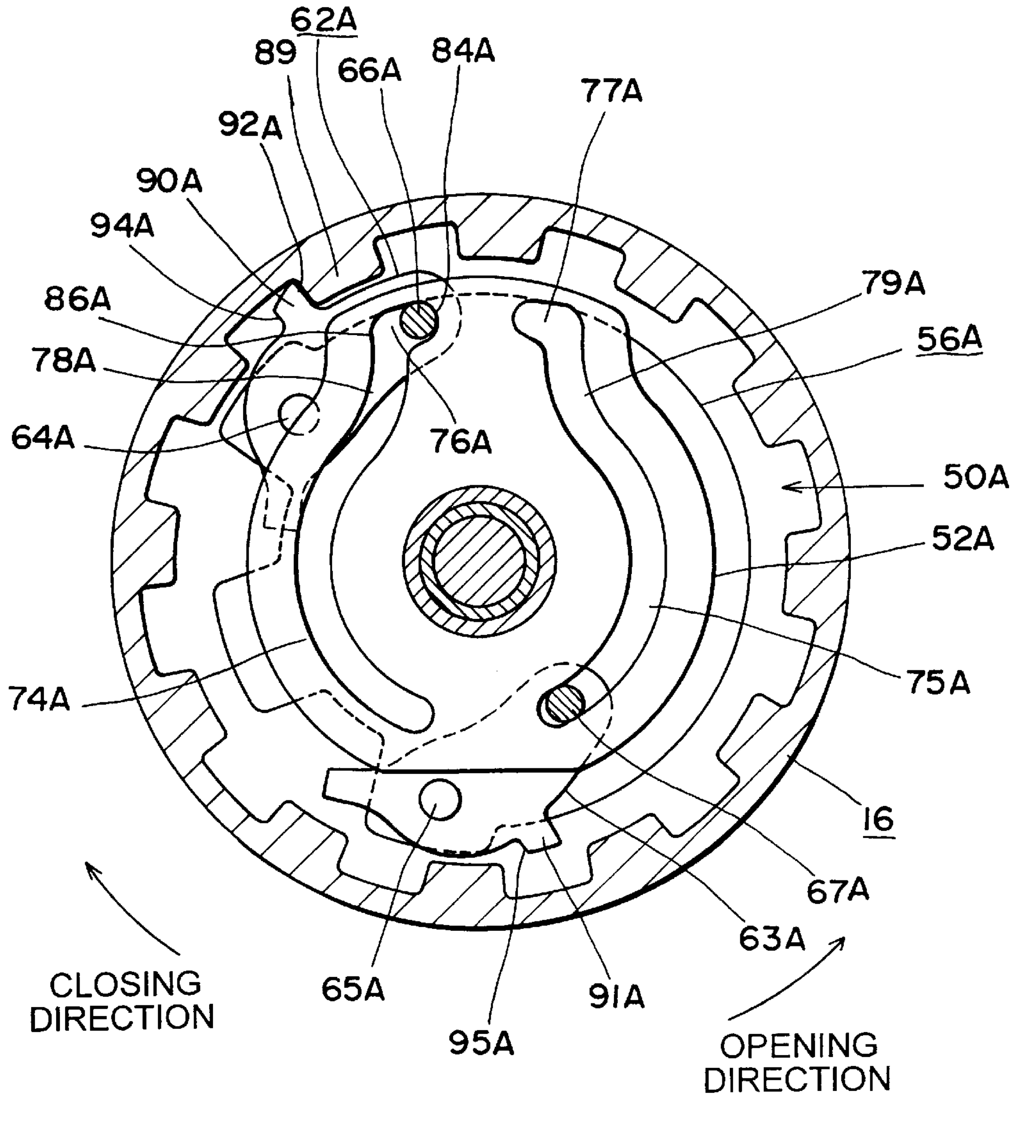
FIG. 30 is an explanation illustration showing a first coupled state of the clutch mechanism.

The coupling face 92A of the clutch pawl 90A which has come into the gap between the projections 89, 89 is soon engaged with the projection 89 of the wire drum 16, as shown in FIG. 30, by the closing rotation of the clutch plate 56A, and rotates the wire drum 16 in the closing direction. Consequently, the wire drum 16 causes the door 12 to slide in the closing direction through the wire cable 17. This state where the coupling face 92A of the clutch pawl 90A is engaged with the projection 89, is the first coupled state of the clutch mechanism 50A. Incidentally, in the first coupled state, the guide plate 52 is also rotated in the closing direction by the engagement between the slide pin 66A and the engaging portion 84A.

Figure 32:
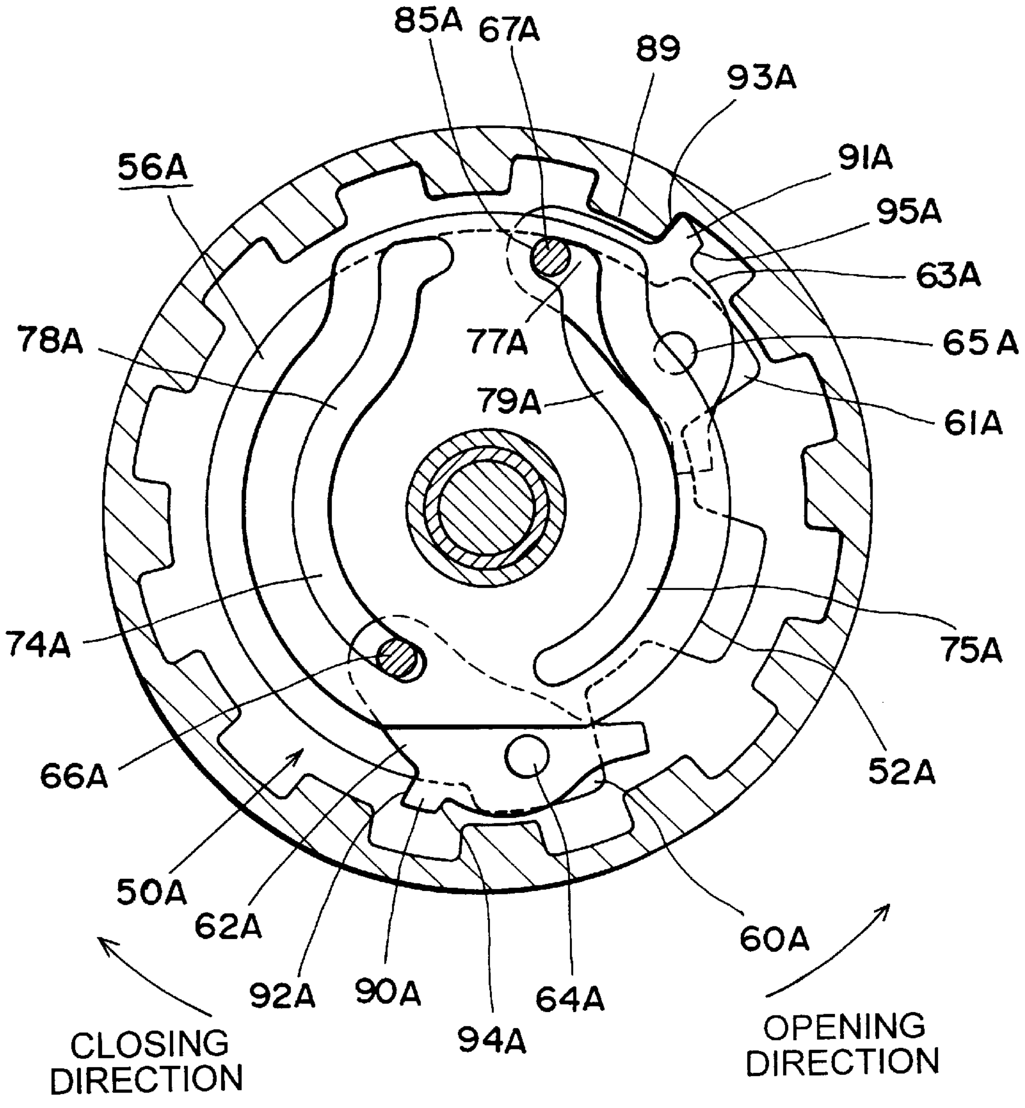
FIG. 32 is an explanation illustration showing a second coupled state of the clutch mechanism.

Furthermore, when rotating the clutch plate 56A in the opening direction in FIG. 26 by the opening rotation of the motor 15, the other clutch arm 63A is swung in the direction of the arrow A, and as shown in FIG. 32, the coupling face 93A of the other clutch pawl 91A is then engaged with the projection 89, thereby the wire drum 16 is rotated in the opening direction. This state where the coupling face 93A of the other clutch pawl 91A is engaged with the projection 89, is the second coupled state of the clutch mechanism 50A.

(Brake State of Clutch Mechanism 50A)

When the external door-accelerating force is applied to the door 12 which is being slid by the power of the motor 15, the door 12 is intended to slide at the over speed exceeding the predetermined speed scheduled by the motor 15 and the reduction mechanism 54. Most of these external forces are applied to the door 12 by the inclination of the vehicle body 11. The external force applied to the door 12 is inevitably transmitted to the wire drum 16 through the wire cable 17.

Figure 31:
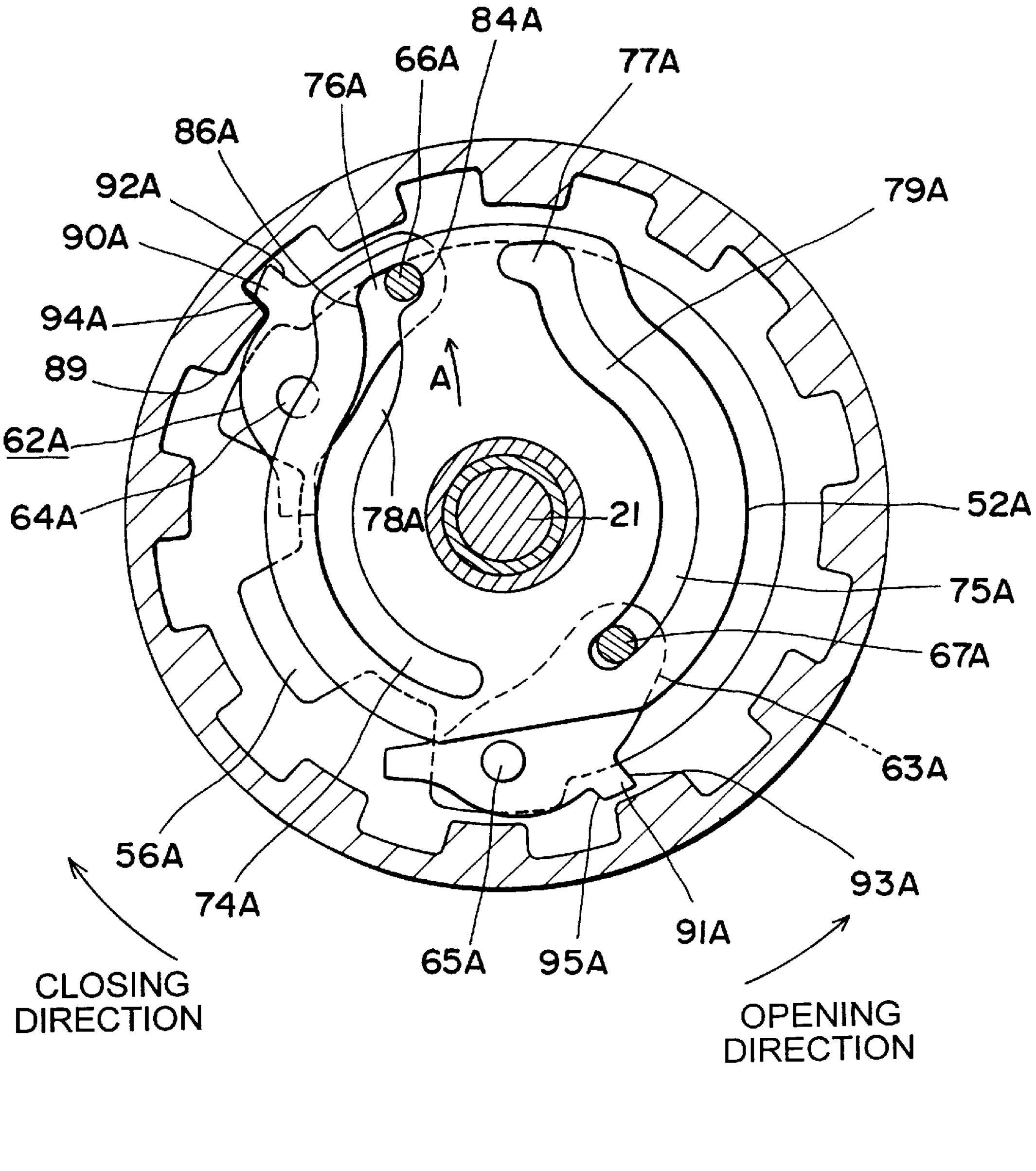
FIG. 31 is an explanation illustration showing a first brake state of the clutch mechanism.

For example, in the first coupled state (FIG. 30) of the clutch mechanism 50A for sliding the door 12 in the closing direction, if the external door-accelerating force is applied to the slide door 12, the drum 16 is rotated in the closing direction by the external force at a speed faster than that of the clutch plate 56A rotating in the closing direction at the predetermined speed by the power of the motor 15. Then, as shown in FIG. 31, another projection 89 of the drum 16 catches up with and comes into contact with the brake face 94A of the clutch pawl 90A. At this time, the swing of the clutch arm 62A in the opposite direction of the arrow A is restricted by the engagement between the slide pin 66A and the engaging portion 84A. Accordingly, when the projection 89 comes into contact with the brake face 94A, the external door-accelerating force is transmitted to the clutch plate 56A. However, the clutch plate 56A is connected to the reduction mechanism 54 of the motor 15, so that it is not rotated at a speed more than predetermined speed. Therefore, to the slide door 12, a braking resistance by the clutch plate 56A (reduction mechanism 54) is applied, and after that, the slide door 12 is slid at the same predetermined speed as the clutch plate 56A. In this way, the state where the projection 89 is engaged with the brake face 94A and the over speed in the closing direction of the slide door 12 is restricted, is the first brake state of the clutch mechanism 50A.

Similarly, in the second coupled state (FIG. 32) of the clutch mechanism 50A for sliding the door 12 in the opening direction, if the external door-accelerating force is applied to the slide door 12, the projection 89 is engaged with the brake face 95A of the clutch arm 63A, thereby the slide door 12 is held at the predetermined speed. This state is the second brake state of the clutch mechanism 50A.

(Return of Clutch Mechanism 50 from Coupled State to Uncoupled State by Motor 15)

The clutch mechanism 50A of the second embodiment can be returned from the coupled state to the uncoupled state by rotating the motor 15 in a reverse direction for a predetermined time or by a predetermined amount F.

When reversing the motor 15 so as to rotate the clutch plate 56A in the opening direction while the clutch mechanism 50A is being in the first coupled state shown in FIG. 30 by the closing rotation of the motor 15, the slide pin 66A is released from the engaging portion 84A of the outer slot 76A, and is moved in the communication slot 78A toward the inner slot 74A. When the clutch plate 56A has stopped by the completion of the reverse rotation of the motor 15 in the predetermined amount F, the slide pin 66A is returned to the inner slot 74A as shown in FIG. 26, and the clutch mechanism 50A is restored to the uncoupled state. The restoring from the second coupled state to the uncoupled state of the clutch mechanism 50A can also be performed under the same principle.

In principle, the controller 96 performs the restoring operation for reversing the motor 15 in the predetermined amount F so as to restore the clutch mechanism 50 to the uncoupled state when the sliding movement of the slide door 12 by the motor 15 is finished.

(Return of Clutch Mechanism 50A to Uncoupled State from Brake State by Motor 15)

The clutch mechanism 50A of the second embodiment can be shifted from the brake state to the uncoupled state through the coupled state by the power of the motor 15.

In the first coupled state (FIG. 26) of the clutch mechanism 50A for sliding the door 12 in the closing direction, if the external door-accelerating force is applied to the slide door 12, the clutch mechanism 50A is displaced to the first brake state shown in FIG. 31. At this time, it is unnecessary for the controller 96 to judge whether the clutch mechanism 50A is in the first coupled state or in the first brake state. That is, in order to restore the clutch mechanism 50A to the uncoupled state, the controller 96 performs the operation for reversing the motor 15 in the predetermined amount F in any state. When rotating the motor 15 in the reverse (opening) direction in the first brake state, the clutch plate 56A is rotated in the opening direction, and the opening rotation of the plate 56A is immediately transmitted to the wire drum 16 by the engagement between the brake face 94A and the projection 89, thereby the load current of the motor 15 is detected by the ampere meter 97 before the completion of the reverse rotation in the predetermined amount F of the motor 15. In this way, the quick detection of the motor load by the reverse rotation of the motor 15 can make the controller 96 consider that the clutch mechanism 50A is in the first brake state. To the contrary, as the reverse rotation in the predetermined amount F of the motor 15 does mot rotate the drum 16 in the first coupled state of the clutch mechanism 50A, the load of the motor 15 is not detected. Accordingly, when the reverse rotation of the motor 15 is completed without the detection of the load of the motor 15, the restoring operation of the controller 96 is finished.

When the load of the motor 15 is detected by the reverse rotation (opening rotation) of the motor, the controller 96 immediately rotates the motor 15 in the closing direction. Then, the coupling face 92A of the clutch pawl 90A is brought into contact with the projection 89, and the clutch mechanism 50A is shifted to the first coupled state as shown in FIG. 26. During this moment, a substantial load is not applied to the motor 15 since the wire drum 16 does not rotate. However, when the clutch plate 56A is further rotated in the closing direction in the, first coupled state, a load for rotating the wire drum 16 is applied to the motor 15 at once. As this (second) load is detected by the ampere meter 97, the controller 96 can consider that the clutch mechanism 50A has been shifted from the first brake state to the first coupled state, and therefore the controller 96 rotates the motor 15 at once in the opening direction in the predetermined amount F. Consequently, the clutch mechanism 50A is returned to the uncoupled state. Thus, by repeatedly changing the rotational direction of the motor 15, the clutch mechanism 50A is returned to the uncoupled state through the first coupled state from the first brake state. The restoring from the second brake state to the uncoupled state of the clutch mechanism 50A can also be performed under the same principle.

(Holding of Door 12 by Clutch Mechanism 50A)

When the motor switch 180 is shifted to the open position in the door-closed state, the ratchet 163 is disengaged from the latch 162 by the powered opening unit 171, and the motor 15 is then rotated in the opening direction to slide the door 12 in the opening direction. During this moment, the clutch mechanism 50A becomes in the second brake state when the strong external force in the opening direction is applied to the door 12, and in other cases, it becomes in the second coupled state. As the door 12 has reached the desired position, the switch 180 is turned off to stop the motor 15. At this time, the controller 96 does not perform the restoring operation for returning the clutch mechanism 50A to the uncoupled state. Accordingly, the clutch mechanism 50A is left in the second coupled state or in the second brake state.

If the state of the clutch mechanism 50 is the second brake state, the opening rotation of the wire drum 16 is immediately transmitted to the motor 15. Accordingly, the door 12 is held in the desired position against the strong external force in the opening direction.

If the motor 15 has stopped while the clutch mechanism 50A is in the second coupled state, it is considered that an external force in the closing direction, or a weak external force in the opening direction, or no external force is applied to the door 12. If the external force in the closing direction is applied to the door 12, the external force in the closing direction is also applied to the wire drum 16, but in the second coupled state, the closing rotation of the wire drum 16 is immediately transmitted to the motor 15, and therefore, the door 12 is held in the desired position against the external force in the closing direction. If the weak external force in the opening direction is applied to the door 12, the door 12 is caused to be slid in the opening direction at an extremely short distance after the motor 15 has stopped, and thereby the clutch mechanism 50A is shifted to the second brake state, and thereafter the slide door 12 cannot be moved. Thus, after the slide door 12 has been moved to the desired position by the operation of the motor switch 180, the slide door 12 is substantially held in the desired position by the clutch mechanism 50A.

The door 12 which is held in the desired position by the clutch mechanism 50A of the second embodiment cannot be moved by the operation with the manual power of the slide door 12. The reason is that in the clutch mechanism 50A of the second embodiment, the engagement between the slide pin 66A or 67A and the engaging portion 84A or 85A is not released, as long as the clutch plate 56A is not moved. This prevents the door 12 from starting to move from the desired position due to the mischief by a child or the like to the door 12.

What is claimed is:

1. A powered sliding device for a slide door slidably attached to a vehicle body, comprising:

- a wire drum adapted to be coupled with the slide door by way of a wire cable;
- a motor for rotating the wire drum;
- a clutch means provided between the wire drum and the motor, said clutch means having a first coupled state for transmitting a closing rotation of the motor to the wire drum, a second coupled state for transmitting an opening rotation of the motor to the wire drum, and an uncoupled state for transmitting neither an opening rotation nor a closing rotation of the drum to the motor, and said clutch means displaceable to the first coupled state by the closing rotation of the motor, and to the second coupled state by the opening rotation of the motor;
- said clutch means being held in the first coupled state or in the second coupled state when the rotation of the motor is stopped by deenergizing the motor when the clutch means is in the first coupled state or in the second coupled state;

said clutch means being returned to the uncoupled state by the opening rotation of the motor by a predetermined amount when the clutch means is in the first coupled state, and said clutch means is returned to the uncoupled state by the closing rotation of the motor by the predetermined amount when the clutch means is in the second coupled state; and wherein said clutch means further has a first brake state for transmitting the closing rotation of the wire drum to the motor, and a second brake state for transmitting the opening rotation of the wire drum to the motor.

2. A powered sliding device according to claim 1, wherein said clutch means is displaced to the first brake state when, in the first coupled state, the wire drum is rotated in a closing direction relative to the motor, and said clutch means is displaced to the second brake state when, in the second coupled state, the wire drum is rotated in an opening direction relative to the motor in the second coupled state.

3. A powered sliding device according to claim 1, wherein said clutch means is returned to the uncoupled state by the opening rotation of the wire drum when the clutch means is in the first brake state, and said clutch means is returned to the uncoupled state by the closing rotation of the wire drum when the clutch means is in the second brake state.

4. A powered sliding device according to claim 1, wherein said clutch means is displaced to the first coupled state by the closing rotation of the motor when the clutch means is in the first brake state, and said clutch means is displaced to the second coupled state by the opening rotation of the motor when the clutch means is in the second brake state.

5. A powered sliding device according to claim 4, further comprising a control means and a detecting means for detecting a load of the motor, wherein said control means considers that the clutch mechanism is displaced to the first coupled state when the detecting means detects a substantial load of the motor while the motor is being rotated in the closing direction for shifting the clutch means from the first brake state to the first coupled state, and said controller considers that the clutch mechanism is displaced to the second coupled state when the detecting means detects the substantial load of the motor while the motor is being rotated in the opening direction for shifting the clutch means from the second brake state to the second coupled state.

6. A powered sliding device according to claim 1, further comprising an elastic holder for defining a full-open section of the slide door, wherein a width of the full-open section is longer than a distance through which the slide door can move by the rotation of the motor by the predetermined amount.

7. A powered sliding device according to claim 1, further comprising a control means, a latch adapted to be rotated to a full-latched position by an engagement with a striker fixed to the vehicle body, and a ratchet for holding the full-latched position of the latch by engaging with the latch, wherein said control means shifts the clutch means to the second coupled state after the latch is displaced into the full-latched position and before the ratchet is released from the latch.

8. A powered sliding device according to claim 1, further comprising a control means, a sensor for detecting a sliding amount of the slide door, and a motor switch for rotating the motor by a manual operation, wherein said control means rotates the motor until the clutch mechanism is displaced to the first coupled state or to the second coupled state when the sensor detects a sliding movement of the slide door by an amount exceeding a predetermined amount within a predetermined period since a turn-off of the motor switch.

9. A powered sliding device according to claim 1, further comprising a speed sensor for detecting a rotational speed of the wire drum, a load detecting means for detecting a load of the motor, and a control means having a reference load of the motor, wherein said control means considers that an undesirable resistance is applied to the slide door when a deceleration of the wire drum is detected while the load measured by the load detecting means is larger than the reference load, and said control means considers that an undesirable resistance is applied to the slide door when the deceleration of the wire drum is detected when the load measured by the load detecting means is continuously smaller than the reference load over a predetermined period.

10. A powered sliding device according to claim 1, further comprising a speed sensor for detecting a rotational speed of the wire drum, a load detecting means for detecting a load of the motor, and a control means having a reference load of the motor, wherein said control means considers that an undesirable resistance is applied to the slide door when a deceleration of the wire drum is detected while the load measured by the load detecting means is larger than the reference load, and said control means considers that the undesirable resistance is applied to the slide door when the deceleration of the wire drum is detected after an elapse of a predetermined period which does not include a moment when the rotational speed of the wire drum is changing while the load measured by the load detecting means is smaller than the reference load.

11. A powered sliding device according to claim 1, wherein said clutch means is not returned to the uncoupled state from the coupled state and from the brake state by the rotation of the wire drum relative to the motor.

12. A method of applying an initial tension to a wire cable which transmits a rotation of a wire drum to a slide door slidably attached to a vehicle body, wherein said wire drum is rotatably attached to a housing with a drum shaft, and said housing includes a tension case movable in a radial direction of the drum shaft, and said tension case includes at least one tension roller; said method comprising the steps of:

fastening the tension case to the housing with a first fastener at a position above the wire drum;

fastening the tension case which is fastened to the housing with the first fastener, to the vehicle body with a second fastener;

loosening the first fastener and then moving the housing downward relative to the tension case and the vehicle body so as to widen a distance between the wire drum and the tension case; and then fastening the housing to the vehicle body with a third fastener.

13. A method of applying an initial tension to a wire cable according to claim 12, wherein said housing moves downward to an appropriate position or to an adjacent position thereto by own weight of the housing when the first fastener is loosened.

14. A powered sliding device for sliding a slide door slidably attached to a vehicle body, comprising:

a housing;

a wire drum rotatably attached to the housing with a drum shaft;

a wire cable for coupling the wire drum with the slide door, said wire cable including a first cable portion for pulling the slide door in a door-opening direction and a second cable portion for pulling the slide door in a doorclosing direction;

a pair of tension rollers being brought into contact with the first cable portion and the second cable portion, respectively;

wherein said tension rollers are slidably attached to one piece of tension case, and a tension spring for urging the tension rollers in the direction of coming closer to each other is attached between the tension rollers, and said a tension case is attached to the housing with a fastener in such a way that the attaching position is adjustable with respect to the wire drum; and wherein said wire drum and said tension case are arranged on the same flat surface.

15. A powered sliding device according to claim 14, further comprising a pin for fastening the tension case to the vehicle body, wherein said fastener has a fastened state of immovably fastening the tension case to the housing, and a loosened state of making the tension case movable relative to the housing.

16. A powered sliding device for a slide door slidably attached to a vehicle body, comprising:

a wire drum adapted to be coupled with the slide door through a wire cable;

a motor for rotating the wire drum;

a clutch mechanism provided between the wire drum and the motor, said clutch mechanism displaceable to a coupled state and an uncoupled state by power of the motor, said clutch mechanism including a clutch gear receiving the power from the motor;

a reduction mechanism for reducing the power of the motor; and wherein said reduction mechanism includes a removable gear for transmitting the power from the motor to the clutch gear, and the arrangement is such that said removable gear is released from the motor while keeping an engagement with the clutch gear.

17. A powered sliding device according to claim 16, wherein said removable gear is rotatably and slidably mounted on an elongated shaft.

18. A powered sliding device for a slide door slidably attached to a vehicle body, comprising:

a housing attached to the vehicle body;

a wire drum attached in the housing and coupled with the slide door through a wire cable;

a motor attached to the housing for rotating the wire drum;

a cam gear rotated by a rotation of the wire drum;

a cam switch provided near the cam gear;

a holder for defining a full-open section of the slide door;

a control means for controlling the motor;

said wire drum being rotated by a predetermined amount exceeding one time of rotation when the wire drum slide the door through a total sliding section of the slide door; and wherein said cam gear is attached on or in the housing, and said cam gear is rotated through less than one time of rotation when the wire drum is rotated by the predetermined amount, and the cam gear includes a cam face which is detected by the cam switch when the slide door is positioned in the full-open section.

19. A powered sliding device according to claim 18, wherein said control means operates the motor to decelerate a sliding speed of the slide door when the cam switch detects the cam face while the slide door is being slid by an opening rotation of the motor.

20. A powered sliding device according to claim 18, wherein said cam gear is rotated around a drum shaft with which the wire drum is attached to the housing.

21. A powered sliding device according to claim 18, further comprising a disk rotated by the rotation of the wire drum and provided with a lot of measuring slits, an optical sensor positioned near the disk for detecting the measuring slits when the disk is rotated to send out pulse signals to the control means, and a battery mounted on the vehicle body, wherein the control means does not supply electrical power from the battery to the optical sensor when the cam switch detects the cam face.

* * * * *